United States Patent [19]

Levavi

[11] Patent Number: 4,708,356
[45] Date of Patent: Nov. 24, 1987

[54] HUMAN POWERED VEHICLES AND MECHANISM PARTICULARLY USEFUL THEREIN

[76] Inventor: Shmuel Levavi, Keren Kayemet Leyisrael St. 18, Givatayim, Israel

[21] Appl. No.: 809,387

[22] Filed: Dec. 16, 1985

[51] Int. Cl.$^4$ .................. B62M 1/08; B62M 1/10; B62M 1/12

[52] U.S. Cl. .................. 280/255; 74/42; 280/232; 280/246; 280/263; 280/281 LP

[58] Field of Search .............. 280/231, 232, 244, 246, 280/247, 252, 253, 255, 256, 257, 263, 281 LP; 74/25, 40, 42

[56] References Cited

U.S. PATENT DOCUMENTS

| | | | |
|---|---|---|---|
| 322,815 | 7/1885 | Fleming | 74/42 |
| 568,862 | 10/1896 | Miehle | 280/231 |
| 581,766 | 5/1897 | Pine | 74/42 |
| 2,402,297 | 6/1946 | Rumsey | 280/263 X |

FOREIGN PATENT DOCUMENTS

| | | | |
|---|---|---|---|
| 845676 | 8/1939 | France | 280/255 |
| 846679 | 9/1939 | France | 280/263 |
| 1123 | 1/1885 | United Kingdom | 280/255 |
| 23780 | of 1894 | United Kingdom | 280/257 |
| 12526 | of 1897 | United Kingdom | 280/257 |

Primary Examiner—John J. Love
Assistant Examiner—Charles R. Watts
Attorney, Agent, or Firm—Benjamin J. Barish

[57] ABSTRACT

A human powered vehicle comprises a chassis supported on a pair of front wheels and a rear wheel; a front seat for supporting a front occupant in a supine position at the front end of the chassis facing the front wheels; a rear seat for supporting a rear occupant in a supine position behind the front seat and also facing the front wheels; and a drive for propelling the vehicle, the drive including foot pedals operated by the front occupant, foot pedals operated by the rear occupant, and hand levers operated by the rear occupant.

13 Claims, 43 Drawing Figures

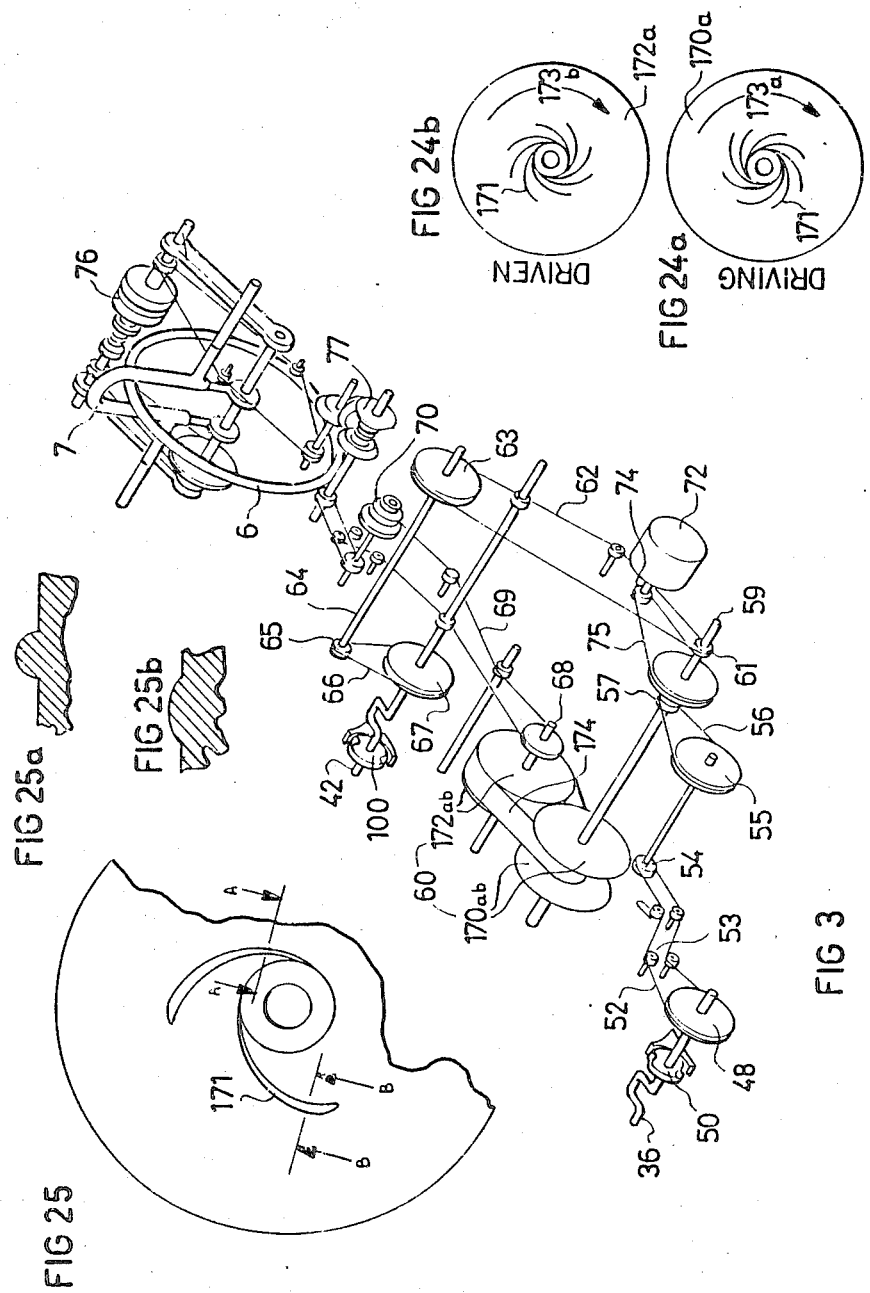

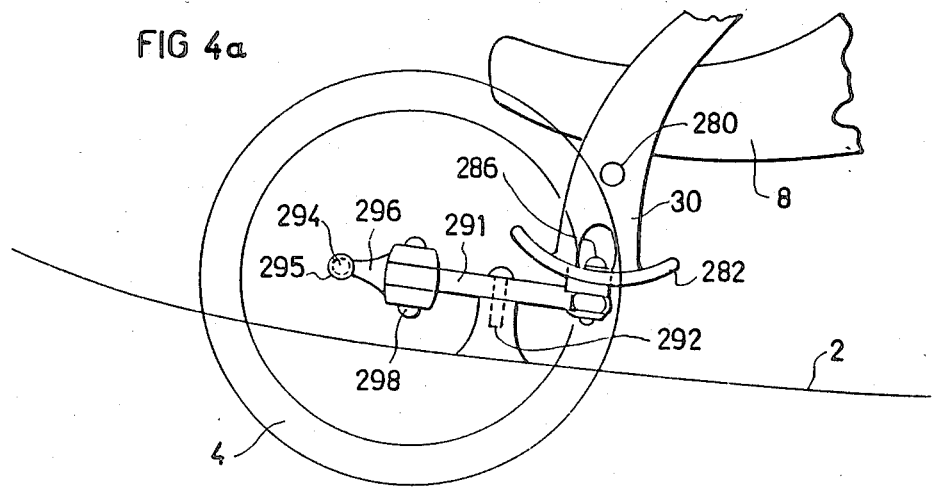
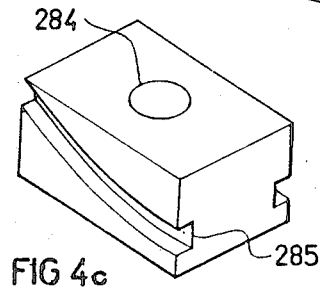
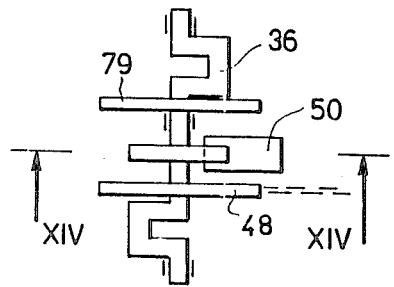
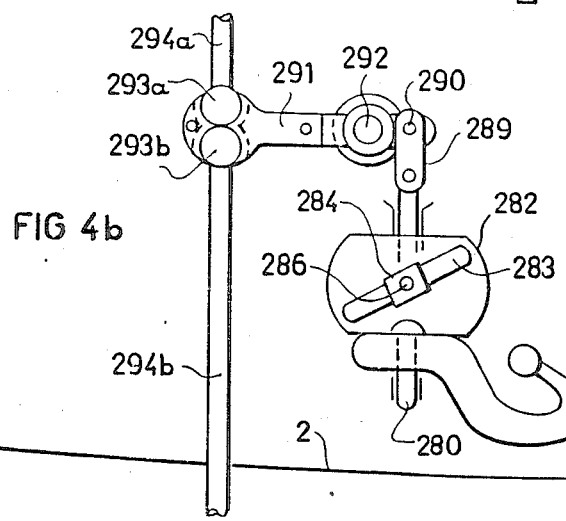

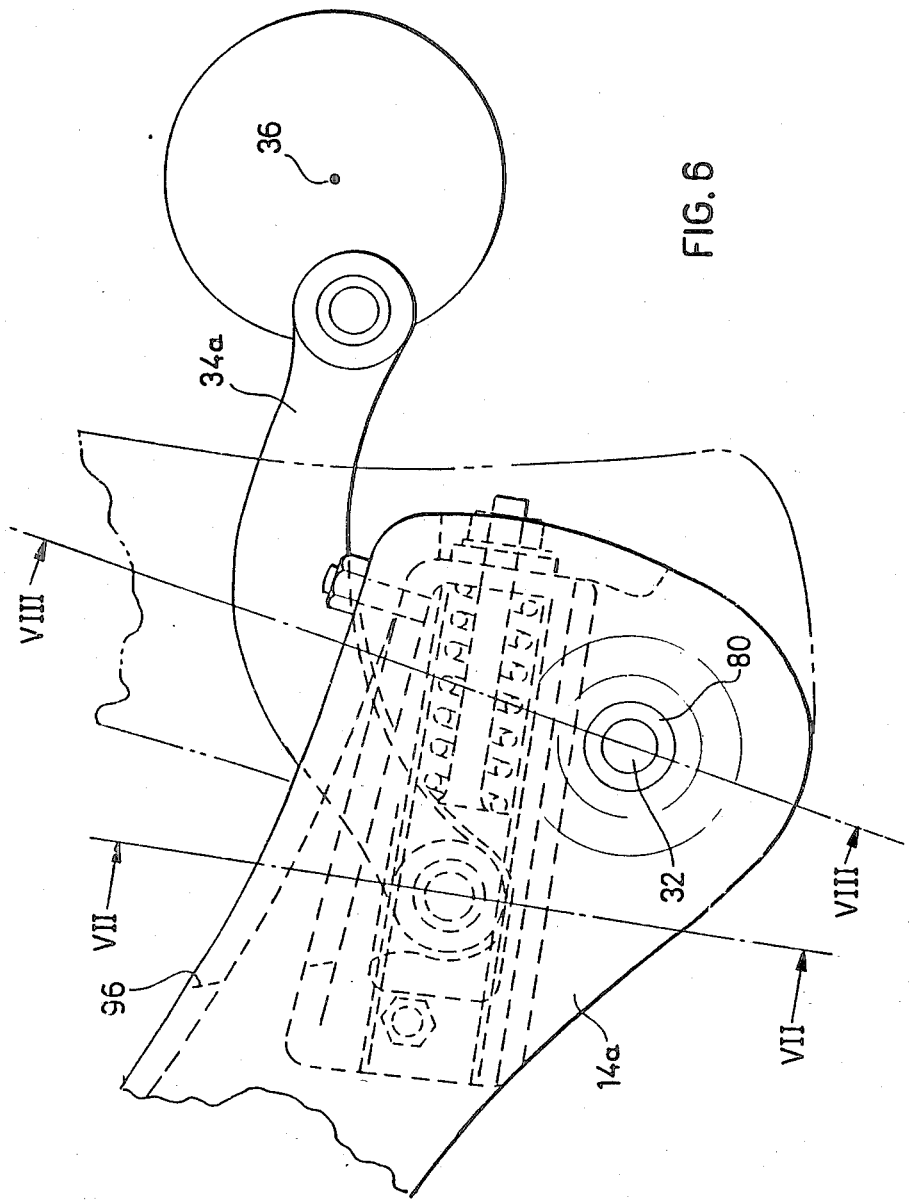

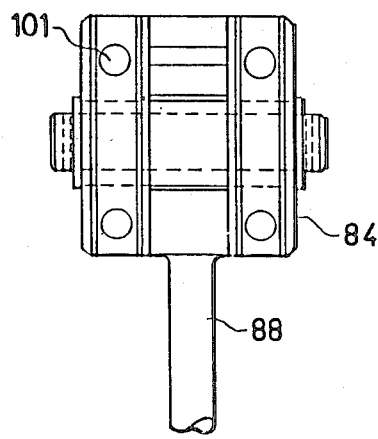
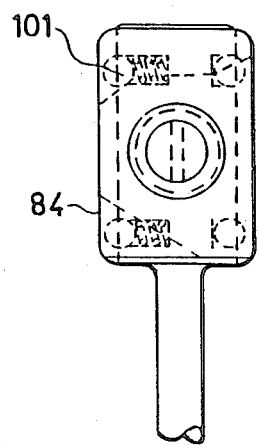
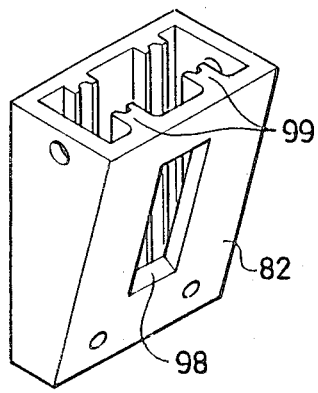
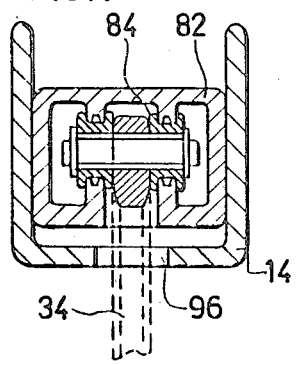
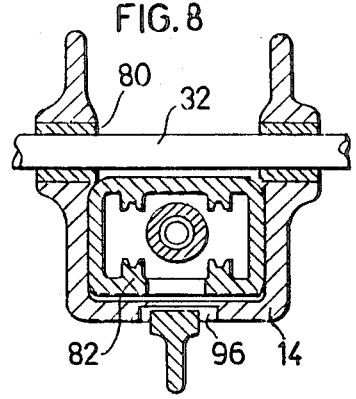
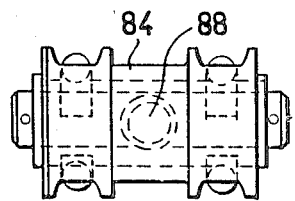

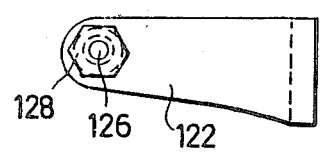
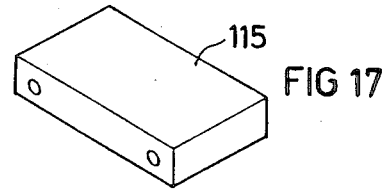
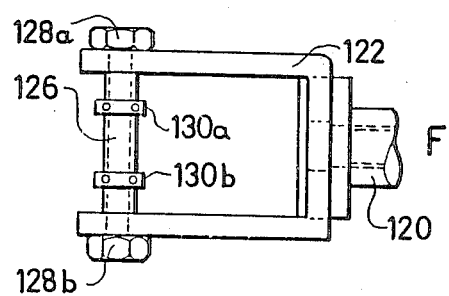
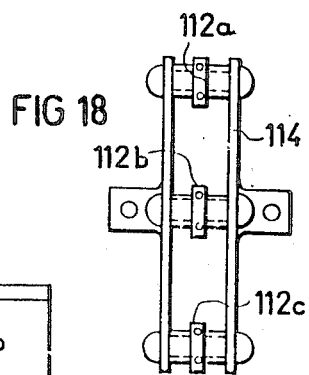
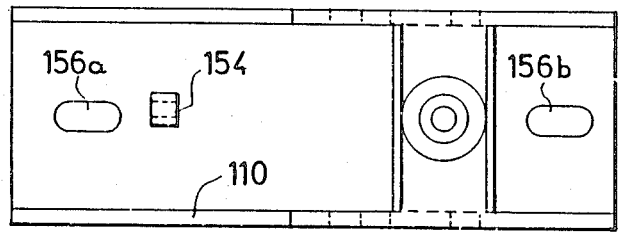
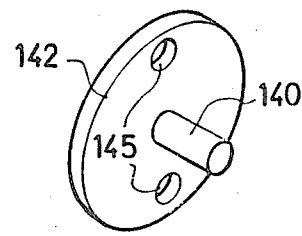
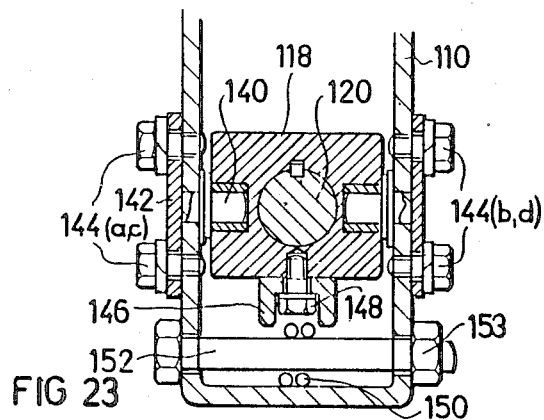

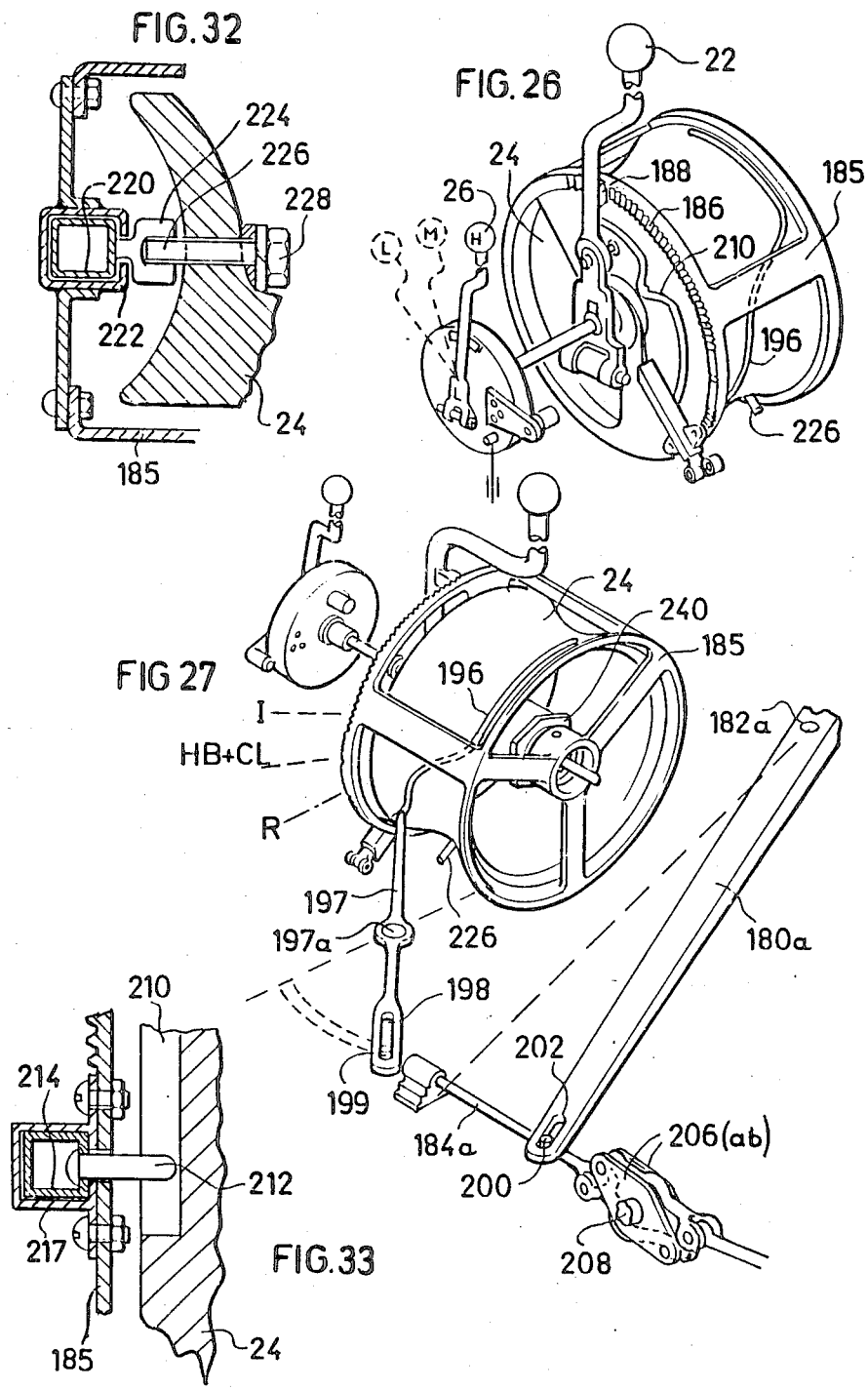

HUMAN POWERED VEHICLES AND MECHANISM PARTICULARLY USEFUL THEREIN

BACKGROUND OF THE INVENTION

The present invention relates to human powered vehicles of the foot-pedal type, and also to mechanisms particularly useful in such vehicles.

Many proposals have been made for vehicles which could be propelled solely by the power of the occupant or occupants, but which provide greater stability, comfort, convenience and speed than does the conventional bicycle or tricycle. Examples of some of the proposed designs are illustrated by U.S. Pat. Nos. 3,920,263 and 4,410,198. The demand for such a human powered vehicle has substantially increased during recent years with the increase in the price of fuel for the conventional motor vehicle caused by the limited fuel resources, but still no human powered vehicle of the foregoing type has yet come into widespread use.

An object of the present invention is to provide a human powered vehicle providing a number of advantages over those heretofore proposed. A further object of the invention is to provide mechnisms of novel design particularly useful in human powered vehicles.

BRIEF SUMMARY OF THE INVENTION

According to one aspect of the present invention, there is provided a human powered vehicle including a chassis, foot pedals operated by the occupant, a drive shaft, a driven wheel driven by the drive shaft, and a motion converter mechanism coupling the foot pedals to the drive shaft, comprising a foot pedal lever pivotably mounting one end of the foot pedals to the vehicle chassis; a slide block slidably mounted on the foot pedal lever adjacent to but spaced from said one end thereof; and a crank arm pivotably mounted at one end to the slide block and pivotably and eccentrically mounted at the opposite end to the drive shaft to and through a dead-center line passing through the pivot points of the crank arm and the axis of the drive shaft. A spring is disposed in the space between the slide block and the one end of the foot pedal lever and urges the slide block to a home position. The vehicle further includes constraining means constraining the slide block to slide towards the one end of the foot pedal lever along a line which forms an angle of less than 90° with the dead-center line of the crank arm with respect to the drive shaft when the slide block is in its home position, such that a force applied to the foot pedal lever when the crank arm is in its dead-center position produces a component of force effective to move the slide block away from its home position and towards the one end of the foot pedal lever against the action of the spring, thereby moving the crank arm away from its dead-center position with respect to the drive shaft.

Such an arrangement permits the vehicle to be powered by applying reciprocating movements to the foot pedal by the occupant's legs, rather than the conventional rotary movements of the foot pedal. This enables the occupant to use his legs to apply longer and more powerful strokes to the foot pedals as compared to previous designs, not only for propelling the vehicle, but also for generating electrical power to supply electrical devices and accessories on the vehicle.

According to a further feature of the present invention, the drive shaft includes a direction-control device which (a) permits free rotation of the drive shaft in one direction; (b) permits limited rotation of the drive shaft in the opposite direction, limited to a portion of a revolution of the drive shaft; and (c) blocks further rotation of the drive shaft in the opposite direction; and a one-way coupling between the drive shaft and the driven wheel for rotating the driven wheel in the one direction. Such an arrangement permits the occupant to reverse the motion of the foot pedals for a portion of a stroke while the foot pedals are decoupled from the drive shaft, for example in order to bring the foot pedals to the beginning of a forward stroke where the foot can apply more power to the vehicle when starting the propulsion.

According to a still further feature of the invention, the vehicle comprises a chassis supported on a pair of front wheels and at least one rear wheel, the rear wheel being the driven wheel; a front seat for supporting a front occupant in a supine position at the front end of the chassis facing the front wheels; a rear seat for supporting a rear occupant in a supine position behind the front seat and also facing the front wheels; and a drive, including the motion converter mechanism, for propelling the vehicle, the drive further including foot pedals operated by the front occupant, foot pedals operated by the rear occupant, and hand levers operated by the rear occupant. Such an arrangement permits the vehicle to be propelled by two occupants, with both occupants facing the direction of travel for better viewing the road ahead, and with the rear occupant facing the back of the front occupant for better synchronizing the operation of the rear foot pedals with those of the front foot pedals operated by the front occupant.

According to yet another feature of the present invention, the drive further comprises a stepped variable transmission including a plurality of gears selectively made operative to vary the transmission in a plurality of distinct steps to provide a selected gear ratio; a continuously variable transmission of novel construction continuously variable within a selected gear ratio to provide a selected output transmission ratio; and manual control means for manually controlling both the stepped variable transmission and the continuously variable transmission. Such an arrangement permits more efficient control of the vehicle transmission during all conditions of operation of the vehicle.

According to additional features of the invention, the vehicle further comprises a vehicle brake, a clutch for selectively coupling or decoupling the foot pedals with respect to the drive, a reverse gear for selectively driving the vehicle either in the forward or rearward direction, and a novel steering arrangement for steering the vehicle.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a schematical top plan view of the vehicle of FIG. 1;

FIG. 3 is a three-dimensional schematical view illustrating the main components of the transmission in the vehicle of FIGS. 1 and 2;

FIG. 3A is a schematical view illustrating a portion of the transmission of FIG. 3 operated by the front occupant;

FIG. 4A is a side elevational view illustrating a portion of the steering mechanism;

FIG. 4B is a top plan view of FIG. 4A;

FIG. 4C is a perspective view illustrating a part of the steering mechanism of FIGS. 4A and 4B;

FIGS. 5 and 6 illustrate the converter mechanism in the vehicle of FIGS. 1 and 2 for converting the reciprocating movements of the foot pedals to a rotary movement of the drive shaft, FIG. 5 illustrating the converter mechanism at the beginning of the forward stroke, and FIG. 6 illustrating it at the end of the forward stroke;

FIG. 7 is a sectional view along lines VII—VII of FIG. 6;

FIG. 8 is a sectional view along lines VIII—VIII of FIG. 6;

FIG. 9 is a three-dimensional view illustrating the housing for the slide block in the converter mechanism of FIGS. 5 and 6;

FIGS. 10, 11 and 12 are front, top and side views, respectively, of the slide block in the converter mechanism of FIGS. 5 and 6;

FIGS. 15-22 illustrate the main components in the direction-control device of FIG. 14;

FIG. 23 is a sectional view along lines XXIII—XXIII of FIG. 14;

FIGS. 24A and 24B illustrate the driving and driven conical discs, respectively, in the continuously variable transmission of FIG. 3;

FIG. 25 is a fragmentary view more particularly illustrating the construction of the conical discs, and FIGS. 25A and 25B are sectional views along lines A—A and B—B, respectively of FIG. 25;

FIG. 26 is a three-dimensional view illustrating the manual control mechanism in the vehicle of FIGS. 1 and 2;

FIG. 27 is a view of the same manual control mechanism as FIG. 26 but from the opposite side;

FIGS. 32 and 33 are sectional view along lines XXXII—XXXII and XXXIII—XXXIII, respectively, of FIG. 29;

DESCRIPTION OF A PREFERRED EMBODIMENT

Overall Construction (FIGS. 1-4)

Figure 1:
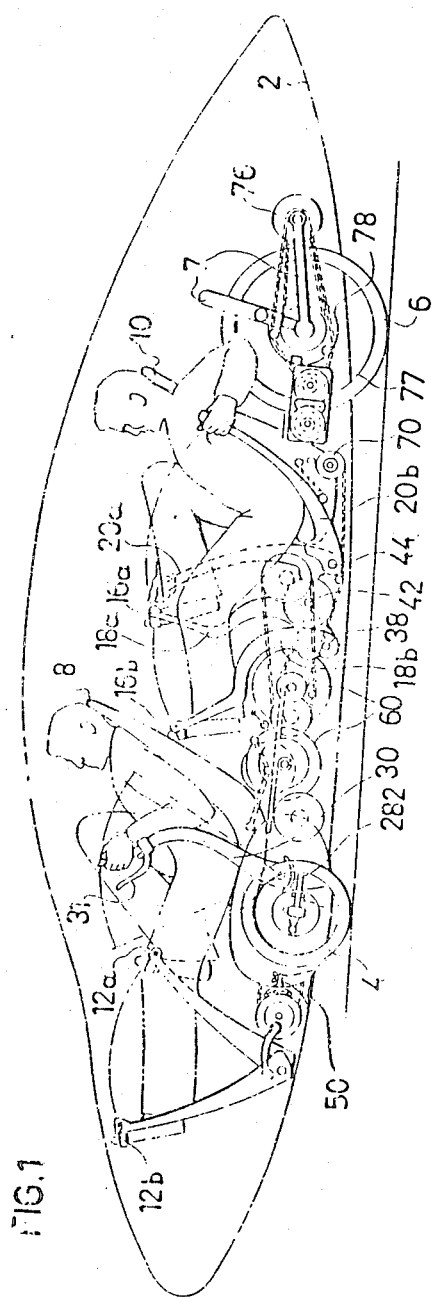
FIG. 1 is a schematical side view illustrating one form of vehicle constructed in accordance with the present invention.

The vehicle illustrated in the drawings is a human powered land vehicle comprising a chassis, generally designated 2, supported on a pair of front wheels 4 and a single rear wheel 6 mounted on a rear suspension 7. Fixed on chassis 2 are a front seat 8 for supporting a front occupant in a supine position (FIG. 1) at the front end of the chassis facing the front wheels, and a rear seat 10 for supporting a rear occupant also in a supine position behind the front seat and also facing the front wheels. The vehicle is propelled by the following: a pair of foot pedals 12A, 12B pivotably mounted at the end of levers 14A, 14B for operation by the front occupant; a similar pair of foot pedals 16A, 16B pivotably mounted at the ends of levers 18A, 18B operated by the rear occupant; and a pair of hand levers 20A, 20B operated by the rear occupant. Control of the vehicle is effected by a hand lever 22 coupled to a control drum 24, by a second hand lever 26 coupled to a control disc 28, by a steering rod 30, and by a hand brake lever 31 pivotably mounted at the upper end of steering rod 30, all operated by the front occupant.

Both of the front foot pedal levers 14A, 14B are pivotably mounted about a shaft 32 fixed to the chassis 2 and are each coupled by a crank arm 34A, 34B to a crank shaft 36. Each of the front foot pedal levers 14A, 14B includes a motion converting mechanism, described below particularly with respect to FIGS. 5-13, which converts the reciprocatory movements of the front pedals 12A, 12B to a rotary motion of the crank shaft 36. Similarly, the rear foot pedal levers 18A, 18B are pivotably mounted to a shaft 38 and are coupled by crank arms 40A, 40B to convert the reciprocatory movements of the rear foot pedals to a rotary movement of a rear crank shaft 42; and the hand levers 20A, 20B operated by the rear occupant are pivotably mounted to a shaft 44 coupled by crank arms 46A, 46B to the rear crank shaft 42. These foot pedal levers and hand levers, as well as the manual control levers 22, 26 and steering rod 30, are all located to facilitate entry and exit of the two occupants. Each of the rear foot pedal levers 18A, 18B also includes a motion-conversion mechanism for converting the reciprocatory movements of the foot pedals to a rotary movement of the rear crank shaft 42.

The latter conversion mechanism, illustrated in FIGS. 5-13 and more particularly to be described below, permits the front and rear occupants to operate their respective foot pedals to trace substantially back and forth linear paths, rather than rotary paths, and thereby effectively permit the occupants to apply larger strokes, and also more powerful strokes, for propelling the vehicle and for generating electricity for powering various electrical accessories that may be included.

As shown in FIG. 3, the front crank shaft 36 drives a one-way clutch 48 via a direction-control device, generally designated 50. The latter device is illustrated in FIGS. 14-23 and will be described more particularly below. Its main function is to permit the crank shaft 36 to be freely rotated in one direction (that in which the torque is transmitted by clutch 48 to the rear wheel 6) but only for a partial revolution in the opposite direction (that in which the torque is not transmitted by clutch 48), in order to permit the front occupant to manipulate the foot pedals 12A, 12B to a position, such as at the beginning of a forward stroke, wherein more force can be applied by his feet to the foot pedals.

One-way clutch 48 is coupled, via sprocket chain 52, guide wheels 53, sprocket wheels 54 and 55, sprocket chain 56, sprocket wheel 57, and friction clutch 58, to the input shaft 59 of a variable transmission, generally designated 60. Input shaft 59 of variable transmission 60 also includes a sprocket wheel 61 coupled by a chain 62, sprocket wheel 63, shaft 64, sprocket wheel 65, chain 66 and sprocket wheel 67 to the rear foot pedals 16A, 16B and hand levers 20A, 20B.

Transmission 60 is illustrated in FIGS. 3, 24 and 25, and will be more particularly described below.

The output of the continuously variable transmission 60 is transmitted via output shaft 68 and sprocket chain 69 to a stepped-gear transmission, generally designated 70. The latter transmission may be of any of the known conventional constructions, including a plurality of gears selectively made operative to vary the transmission in a plurality of distinct steps so as to provide a selected gear ratio to the rear wheel 6 of the vehicle.

It will thus be seen that the vehicle illustrated in the drawings includes a conventional stepped gear transmission 70 to provide a selected gear ratio, and also a continuously variable transmission 60 which is continuously variable within a selected gear ratio to provide a selected output transmission ratio. In the construction illustrated in the drawings, the stepped gear transmission 70 includes three selectable gears, designated "low", "medium", and "high"; the gear is selected by manual control lever 26 in FIG. 2 operated by the front occupant. However, the operator may also control the continuously variable transmission 60, by hand lever 22, in order to continuously vary the transmission ratio within any one of the three selected gears. Such an arrangement permits the operator to select the most efficient gear transmission ratio under all conditions of operation of the vehicle.

The manual controls effected by levers 22 and 26 are illustrated in FIGS. 26-34 and are more particularly described below. At this point, it may be noted that manual control levers 22 and 26 control not only the transmission ratio, as briefly mentioned above, but also control friction clutch 58 between the crank shaft and transmission 60, and a jaw clutch 76 just rearwardly of the rear wheel 6. Friction clutch 58, among other functions, permits operation of electrical appliances with which the vehicle is equipped while the vehicle is stationary or coasting. For this purpose, the vehicle is equipped with a generator 72 driven by the input shaft 59 to transmission 60 via sprocket wheel 74 and chain 75. Jaw clutch 76, also controlled by the manual control levers 22, 26, decouples the rear wheel 6 from the transmission, e.g. to control the gear transmission 70 and/or the continuously variable transmission 60, while the vehicle is stationary. These control levers, particularly control lever 22, also enables the operator to actuate reverse gear 77 in order to reverse the direction of travel of the vehicle, and a disc brake 78 (FIGS. 1, 2) for each of the three wheels for braking the vehicle.

The illustrated vehicle further includes a flywheel 79 (FIGS. 2 and 3A) fixed to the front crank shaft 36. Flywheel 79 is also used for operating an electrical indicator circuit, illustrated in FIGS. 35 and 36 and to be more particularly described below.

Reciprocatory-to-Rotary Converter (FIGS. 5–13)

FIGS. 5–13 illustrate the construction and operation of the converter mechanism which converts the reciprocatory movements of the front pedals 12A, 12B, and the rear pedals 16A, 16B, to rotary movements of their crank shafts 36 and 42, respectively. While FIGS. 5–13 illustrate this converter mechanism as applied to the front foot pedal levers 14A, 14B for rotating crank shaft 36 via crank arms 34A, 34B, it will be appreciated that a similar mechanism is applied to the rear foot pedal levers 16A, 16B, for rotating the rear crank shaft 42 via crank arms 40A, 40B.

Figure 5:
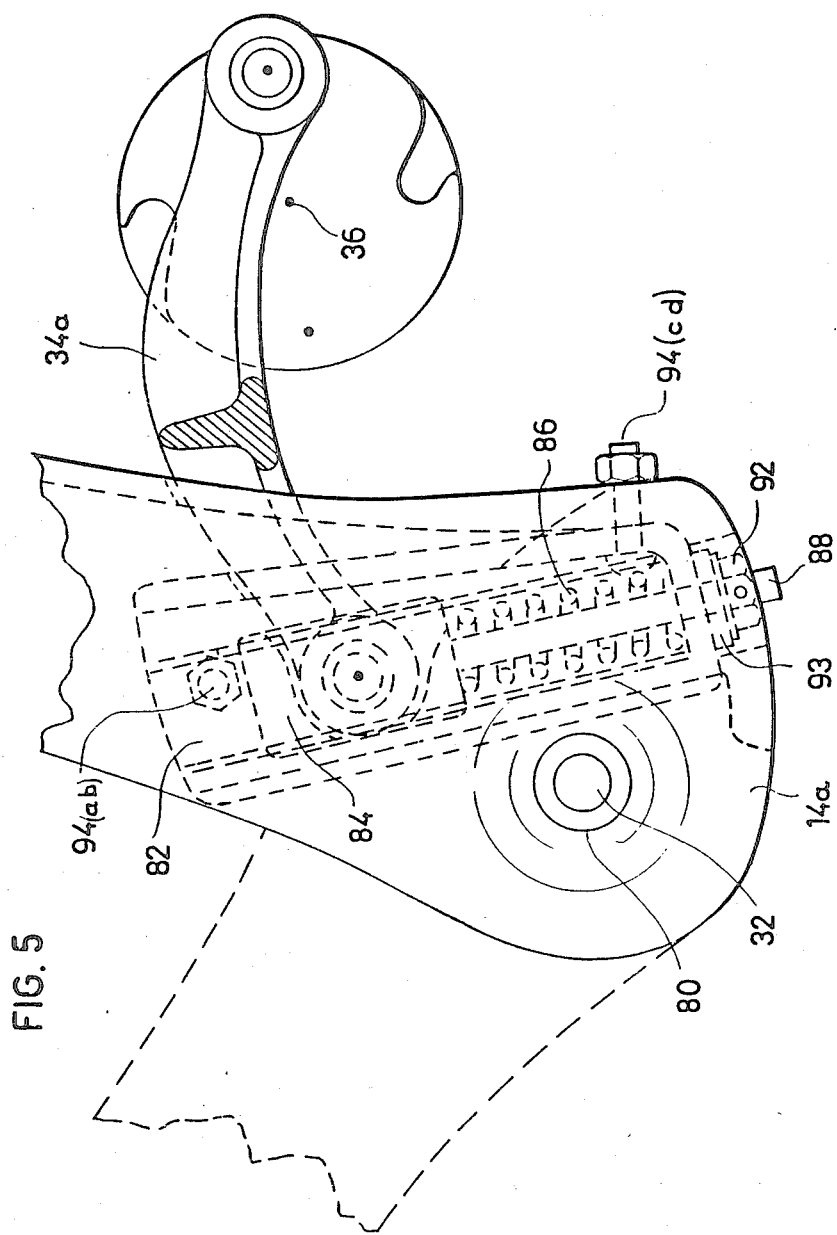

Thus, with respect to foot pedal lever 14A illustrated in FIGS. 5 and 6, this lever is coupled by a bearing 80 to the front axle 32 so as to rotate the front axle with each reciprocatory stroke of the lever. A housing 82 is secured to the lower end of the lever 14A, adjacent to its pivot axle 32, and a slide block 84 is slidably mounted within housing 82. Slide block 82 is urged to a normal position, as illustrated in FIG. 5, by a heavy spring 86 interposed between the bottom of the slide block and the bottom of housing 82. Crank arm 34A coupling lever 14A to crank shaft 36 is pivotably mounted to the upper end of slide block 84. A stem 88 is secured to the lower end of the slide block and passes through an opening formed in the bottom wall of housing 82, to guide the movement of the slide block within the housing. A nut 92 is secured to the end of stem 88 projecting through the bottom wall of housing 82 for limiting the upward movement of slide block 84 under the action of spring 86. A rubber disc 93 is also fixed to the bottom of stem 88 so as to cushion the impact of the nut against the housing during this upward movement of the slide block.

Foot pedal lever 14A is formed of channel configuration at its lower end in order to accomodate slide block housing 82, which housing is secured to lever 14A by means of four bolts 94. The wall of foot lever 14A is formed with an elongated slot 96 (FIG. 7) for accomodating crank arm 34 during its reciprocatory movements.

The construction of housing 82 is more particularly illustrated in FIG. 9, wherein it will be seen that it is formed with a slot 98 through one wall for accomodating crank arm 34A, and with an inner guide 99 for slidably receiving block 84. Block 84, as shown particularly in FIGS. 10–12, is provided with a plurality of spring-biassed balls 101 receivable within guide 99 of housing 82 to provide a low-friction sliding movement of block 84 within housing 82.

The operation of the reciprocatory-to-rotary motion converter illustrated in FIGS. 5–12 will now be described particularly with respect to the diagram of FIG. 13.

First, it is to be noted that X indicates the axis of crank shaft 36, $S_1$ indicates the pivot point of crank arm 34A on slide block 84, so that line T indicates the dead-center line of the crank arm. Thus, point $Y_1$ indicates the dead-center position of one end of the crank arm at the beginning of its forward stroke, and point Z indicates the dead-center position at the beginning of the return stroke. Slide block 84 is normally in the position illustrated in FIG. 13 because of the influence of spring 86.

Figure 13:
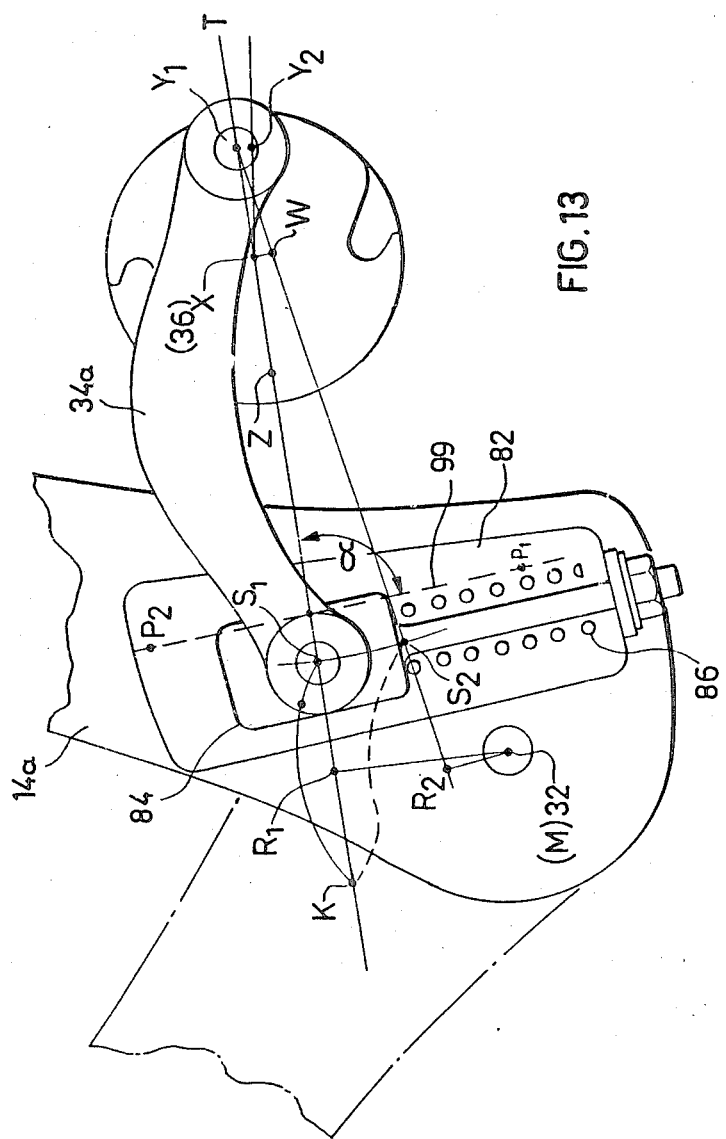
FIG. 13 is a kinematic diagram helpful in explaining the operation of the converter mechanism of FIGS. 5 and 6.

An important characteristic of the mechanism illustrated in FIGS. 5–13, is that the axis of slide block housing 82, defined by line $P_1$–$P_2$ representing the surfaces of guides 99, forms an angle of less than 90° with the dead-center line T of the crank arm 34A with respect to the crank shaft 36. This angle, illustrated as "$\alpha$" in FIG. 13, is preferably from 80°–89°. Thus, whenever the crank arm 34A is in its dead-center position, a component of force will be applied to move slide block 84 downwardly within its housing 82 to move the pivot point of crank arm 34A downwardly away from the dead-center line T, thereby extracting the crank arm from its dead-center position.

It will thus be seen that as foot pedal lever 14A is oscillated about its axis 32, crank arm 34A will be oscillated to rotate crank shaft 36. Should the foot pedal lever 14A stop at the dead-center line T, the driver applies a sharp impact to the foot pedal, which compresses heavy spring 86. This produces a component of force applied to move slide block 84 downwardly, against the action of spring 86, thereby lowering the pivot point $S_1$ of crank arm 34A to point $S_2$. Accordingly, the force applied by pivoting pedal lever 14A about pivot 32 is now applied along the line $S_2$–$Y_1$, thereby producing a component of force, represented by line XW, moving the crank arm 34A out of the dead-center line such that the pivotal end of the crank arm moves clockwise from point $Y_1$ to $Y_2$.

During the continued movement of the foot pedal, spring 86 returns slide block 84 back to its normal position. The pivot axis of crank arm 34A, initially at point $S_1$, moves to point K by the pivoting of the lever about pivot point 32. The energy stored in spring 86 is released during this time, thereby greatly aiding the foot pedals in rotating the crank shaft.

It will thus be seen that the conversion mechanism illustrated in FIGS. 5–13 effectively converts the reciprocatory movements of the front foot pedals 12A, 12B to a rotary movement of the crank shaft 36, and effectively extracts the crank shaft from the dead-center position should the vehicle have been stopped at this position. Moreover, the moment of force applied to the crank shaft as it moves out of its dead-center position is very large. Thus, this movement of the crank shaft is aided by the energy stored in spring 86. Moreover, the force applied to the crank shaft at the beginning of the movement out of dead-center is applied from point $S_2$ of lever 14A, rather than from point $S_1$. Since point $S_2$ has moved closer to the pivot axis 32, the force applied at that point to the crank shaft is increased by the ratio $R_1/R_2$, wherein $R_1$ represents the distance between points $S_1$ and 32 normal to the direction of application of the force to lever 14A, and $R_2$ represents the corresponding distances with respect to point $S_2$. It will thus be seen that a very substantial moment of force is applied to the crank shaft to move it out of its dead-center position, without losing any fraction of the stroke length compared with the original path $S_1$-K, despite the exchange of load arm M-$R_1$ for that of M-$R_2$.

As indicated earlier, while the conversion mechanism illustrated in FIGS. 5–13 is shown as applied to lever 14A of the front foot pedal 12A, it will be appreciated that a similar mechanism is provided also with respect to lever 14B for the other front foot pedal 12B, and for levers 18A and 18B for the rear foot pedals 16A and 16B. Accordingly, the reciprocatory foot movements by the front and rear occupants trace substantially linear paths, rather than arcuate paths, which conveniently permit the occupants to apply longer and more powerful foot and hand strokes than in a conventional bicycle propulsion system wherein the foot pedal motions trace arcuate or circular paths.

The foregoing operation of the motion-conversion mechanism in extracting the transmission from a dead-center position is particularly effective during starting the vehicle from a complete stop, should the vehicle be stopped in the dead-center positions of its crank shafts. During the normal operation of the vehicle, flywheel 79 applied to the front crank shaft 36 aids in moving that crank shaft past its dead-center position. No flywheel is needed for the rear crank shaft 42, which has the required momentum because of its own mass. Flywheel 79 applied to the front crank shaft 36 also performs another function, in controlling electrical light indicators, as described below with respect to FIGS. 35 and 36.

Direction-Control Device (FIGS. 14–23)

As indicated earlier, the front crank shaft 36 is provided with a direction-control device, generally designated 50 (FIG. 3), which permits the crank shaft to be rotated in the direction in which one-way clutch 48 transmits the torque to the rear wheel 6 for propelling the vehicle. Direction-control device 50 also permits crank shaft 36 to be rotated by the foot pedals in the opposite direction (i.e., wherein its torque is not transmitted by clutch 48 to the vehicle wheel), but only for a partial revolution of the crank shaft, for example to permit the operator to move the foot pedals to the position at the beginning of a forward stroke in order to allow the operator to apply more force in starting the vehicle from a stationary condition. After this partial revolution in the reverse direction has been completed, the direction-control device 50 prevents any further reverse rotation of crank shaft 36.

A similar direction-control device 50 is also applied to the rear crank shaft 42, as shown schematically at 100 in FIG. 2.

Direction-control device 50 for the front crank shaft 36 (and also 100 for the rear crank shaft 42) is more particularly illustrated in FIGS. 14–23. As shown particularly in FIG. 14, this device includes a rotatable member 102 in the form of a drum keyed to the front crank shaft 36 so as to be rotated therewith. The outer cylindrical surface of drum 102 is formed with two opposed recesses 104A, 104B each closable by a cover 106A, 106B pivotably mounted to the drum either to a closed condition, as illustrated by cover 106A in FIG. 14, or to an open condition as illustrated by cover 106B. The outer surfaces of the two covers are curved so as to conform to the cylindrical curvature of the outer surface of drum 102, so that when the cover is in its closed condition, as illustrated by cover 106A, it provides a flush surface with the drum. The outer surfaces of drum 102 and of the two covers are lined with a rubber layer for cushioning purposes.

A mounting member 110 is fixed to the vehicle chassis 2 just laterally of drum 102. Three rollers 112A–112C carried by an arm 114 (FIG. 18) mounted to the upper end of member 110 bear against the outer face of drum 102, and of the covers 106A, 106B when in their closed positions. The rollers are adjustable for this purpose by threaded fastener 116 engaging arm 114 by means of plate 115 (FIG. 17).

Figure 14:
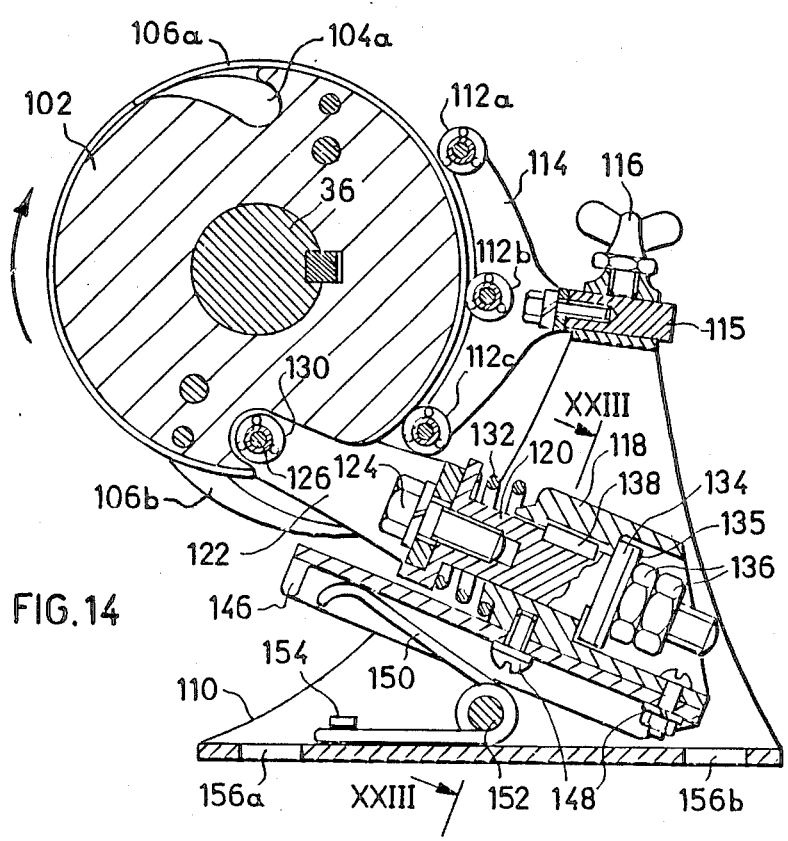
FIG. 14 is a transverse-sectional view, along lines XIV—XIV of FIG. 3a, illustrating a direction-control device in the transmission of FIG. 3.

Member 110 further mounts a tube 118 slidably receiving a rod 120 carrying a fork member 122 at its outer end facing drum 102. The inner end of fork member 122 is secured to rod 120 by a fastener 124, and the outer end of member 122 carries a pin 126 secured by outer nuts 128A, 128B (FIG. 19) and carrying a pair of bearings 130A, 130B receivable within the drum recesses 104A, 104B when the respective cover 106A, 106B is pivoted to its open position. FIG. 14 illustrates these bearings received within recess 104B whose cover 106B is in its open position. Bearings 130A, 130B are urged into these recesses by means of a coiled spring 132 interposed between tube 118 and rod 120. The outer end of rod 120 is provided with a rubber disc 134 engageable with an annular shoulder formed in tube 118 to limit the projected position of the two bearings 130. Disc 135 is secured to the reduced end of rod 120 by a pair of nuts 136. Rod 120 is formed with a slot receiving a key 138 to prevent the rotation of the rod during its sliding movement within tube 118.

As shown particularly in FIG. 23, tube 118 is of rectangular cross-section and is pivotably mounted by a pair of pins 140 between the side walls of mounting member 110. The mounting pins 140 are carried by discs 142 (FIG. 22) secured by bolts 144 passing through disc openings 145, to the side walls of mounting member 110. A channel member 146 is secured by fasteners 148 to the lower end of tube 118, and a spring 150 is interposed between the bottom wall of mounting member 110 and channel member 146 urging tube 118, and thereby rod 120 sliding within it, to bias bearings 130 carried at the end of fork 122 radially inwardly of drum 102. Spring 150 is retained in place by a pin 152 secured by a nut 153 to extend across the lower end of mounting member 110 and passing through the center loop of the spring. One end of the spring is anchored to the mouting plate by a sleeve 154 (also see FIG. 21), the opposite end of the spring bearing against channel member 146 carried by tube 118.

The bottom wall of mounting member 110 is formed with a pair of elongated slots 156 (also see FIGS. 14 and 21) for receiving fasteners passing through the chassis frame in order to permit adjustment of the mounting member with respect to drum 102. Rollers 112 carried by arm 114 may be adjusted towards and away from drum 102 by fastener 116.

Figure 15:
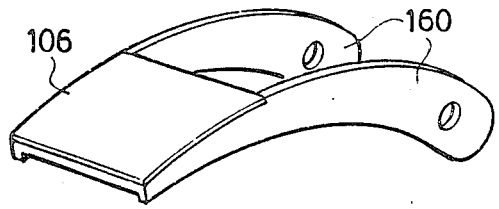
Figure 16:
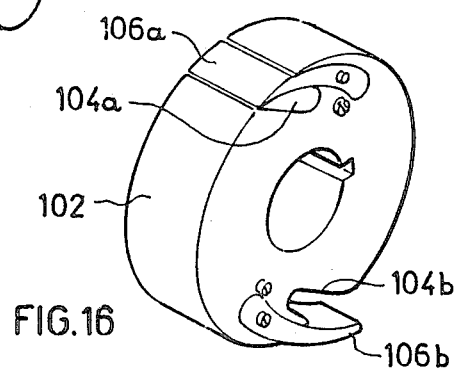

As shown particularly in FIGS. 15 and 16, each of the covers 106A, 106B is pivotably mounted by means of a pair of arms 160 just forwardly of the leading edge of the respective drum recess 104A, 104B in the normal direction of rotation of crank shaft 36 coupled to the drum. That is to say, in FIG. 14 the normal direction of rotation of crank shaft 36 and drum 102 is clockwise, this being the direction wherein the torque applied to the crank shaft is transmitted via the one-way clutch 48 (FIG. 3) to the rear vehicle wheel 6. Accordingly, as crank shaft 36 and drum 102 rotate in this normal direction (clockwise), rollers 112 carried by arm 114 engage the cover and retain it in its closed condition closing its respective recess when the leading edge of the closed cover is engaged by bearings 130 carried by fork 122. However, should crank shaft 36, thereby drum 102, be rotated in the reverse direction (counter-clockwise), the cover which is at the lower part of drum 102 (shown as cover 106B in FIG. 14) will pivot to an open position by its own weight, to thereby uncover its recess (104B). Since the recess is now at the leading side of the cover in this reverse direction of rotation of drum 102, bearings 130 carried by rod 120 will seat within the recess under the influence of spring 150, and will therefore block the drum from rotating in this direction, the force exerted by the drum being taken up by spring 132.

It will thus be seen that the direction-control device 50, as illustrated particularly in FIG. 14, permits the front foot pedals to be operated in order to rotate crank shaft 36, and thereby drum 102, in the forward direction (clockwise in FIG. 14) for transmitting the torque via clutch 48 to the vehicle rear wheel 6; covers 106A, 106B are closed during this direction of rotation of drum 102. However, should the operator operate the foot pedals in the reverse direction, crank shaft 36 will start to rotate in the reverse direction (counter-clockwise in FIG. 14), whereupon the lower cover (106B in FIG. 14) will pivot to its open position, thereby exposing its recess (104B) for receiving rollers 130 carried by fork 120 to block this reverse rotation of the crank shaft. Howver, before this reverse rotation is blocked, the crank shaft will be permitted to rotate a partial revolution until rollers 130 seat within the recess exposed by the open cover.

This arrangement enables the operator to move the foot pedals in the reverse direction for a limited amount (maximum being one-half the revolution of drum 102) in order to locate the foot pedals to a more convenient position, wherein more muscle power can be applied, for example at the beginning of the forward stroke of the foot pedals. If the direction control device 50 was not present, the to-and-from movements of the foot pedals might be caught endlessly in an undesired direction of rotation, providing no propulsion. Thus, when a recess is blocked, the pedal movement constrains the crank shaft 36 to be rotated in the correct direction only.

Continuously-Variable Transmission (FIGS. 3, 24 and 25)

As briefly described earlier, the vehicle illustrated in the drawings comprises a continuously variable transmission, generally designated 60 in FIGS. 2 and 3, in addition to the stepped gear transmission 70 conventionally provided such vehicles. The input shaft 59 to the continuously variable transmission 60 is coupled to the front crank shaft 36 by sprocket wheel 57 (FIG. 3) and to the rear crank shaft 42 by one-way clutch 67. Rear crank shaft 42, driven by the rear foot pedals 16A, 16B and hand levers 20A, 20B, also includes a direction-control device, generally designated 100 (FIG. 3), corresponding to device 50 described above with respect to FIGS. 14-23. Rear crank shaft 42 is coupled to sprocket wheel 61 on the input shaft 59 to the continuously variable transmission 60 via the previously mentioned one-way clutch 67, chain 66, sprocket wheel 65, shaft 64, sprocket wheel 63 and chain 62, which step-up the rotary motion from the rear foot pedals 16A, 16B and hand levers 20A, 20B, before applied to transmission 60.

The continuously-variable transmission 60 comprises a first pair of conical discs 170A, 170B, and a second pair of conical discs 172A, 172B coupled together by a belt 174. Conical discs 170A, 170B are movable towards and away from each other to define a first variable diameter pulley; and conical discs 172A, 172B are also movable towards and away from each other to define a second variable-diameter pulley. Belt 174 couples the pair of conical discs 170A, 170B fixed to the input shaft 59 with the pair of conical discs 172A, 172B fixed to the output shaft 68 so as to provide a transmission ratio between the two pairs of conical discs and thereby between the input shaft 59 and output shaft 68, corresponding to the ratio of the effective diameters of these two pulleys defined by the two pairs of conical discs.

As mentioned earlier, and as shown in FIG. 3, output shaft 68 is coupled by the sprocket wheel chain 69, to the stepped variable transmission 70 including the three gears "high", "medium" and "low", which may be selectively made operative by manual control lever 26, FIG. 2, so that the operator (in this case the front occupant) may select any one of the three gears of the stepped variable transmission 70, and then may vary the continuously variable transmission 60 by means of manual lever 22, FIG. 2.

As shown particularly in FIG. 2, the control of the spacings of the two pairs of conical discs 170A, 170B and 172A, 172B for controlling transmission 60 is effected by a pair of arms 180A, 180B pivotably mounted to the vehicle chassis at 182A, 182B respectively, between the two pairs of conical discs. Arms 180A, 180B are coupled to conical discs 170A, 170B at one side of pivots 182A, 182B, and to conical disc 172A, 172B at the opposite side of the pivots. The outer ends of arms 180A, 180B are connected by rods 184A, 184B to drum 24 controlled by manual control lever 22 such that when these ends of the two arms 180A, 180B are pivoted towards each other, conical discs 170A, 170B are moved towards each other, whereas conical discs 172A, 172B are moved away from each other; this movement of the two arms thus increases the effective diameter defined by conical discs 170A, 170B and decreases the effective diameter defined by conical discs 172A, 172B. When the ends of arms 180A, 180B coupled to rods 184A, 184B are pivoted in the opposite direction, away from each other, conical discs 170A, 170B are moved away from each other thereby decreasing their effective diameter, and conical discs 172A, 172B are moved towards each other thereby increasing their effective diameter.

The manner in which arms 180A, 180B is pivoted by the operation of manual lever 22 in order to vary the transmission ratio of the continuously variable transmission 60 is more particularly illustrated in FIGS. 26–34 described below.

FIGS. 24A and 24B illustrate the confronting faces of the two conical discs 170A, 170B, FIG. 24A illustrating the inner face of the driving disc 170A, and FIG. 24B illustrating the inner face of the driven disc 172A. It will be appreciated that the confronting faces of the other (lower) conical disc 170B, 172B in each pair are of similar construction. Thus, as shown, the faces of all the conical discs are formed with a plurality of ribs 171 of spiral configuration. Ribs 171 in the driving discs 170A, 170B radiate outwardly from the center of the disc in the direction of rotation of the discs as indicated by arrow 173A in FIG. 24A, whereas the ribs radiate inwardly in the driven discs 172A, 172B in the direction of rotation as indicated by arrow 173B in FIG. 24B. In all the discs, the inner end of each spiral rib 171 is substantially tangential to the inner edge of the conical disc. The outer end of each rib terminates at an intermediate point on its respective disc and is substantially tangential to a circle passing through these intermediate points on each disc.

As shown in FIGS. 25, 25A, and 25B, each of the ribs 171 progressively varies in height and width from its inner end to its outer end. Thus, their height is largest at their inner ends (FIG. 25A) and progressively decrease towards their outer ends (FIG. 25B); and their width is smallest at their inner ends (FIG. 25A) and progressively increase toward their outer ends (FIG. 25B).

This arrangement minimizes belt slippage by urging the coupling belt 174 inwardly of the respective pair of conical discs during their rotation until limited by the effective diameter of the two discs defined by their spacing.

Manual Controls (FIGS. 26–34)

FIGS. 26–34 illustrate not only the manner of controlling the continuously variable transmission 60 via operation of manual control lever 22, but also other controls effected by control lever 22 as well as by control lever 26, both operated by the front occupant of the vehicle.

Briefly, hand lever 26 controls the three-speed gear transmission 70 (FIG. 3) and also the jaw clutch 76; and hand lever 22 controls the continuously variable transmission 60, reverse gear 77, hand brake 78, friction clutch 58, and also the jaw clutch 76.

The controls by hand lever 22 are effected via drum 24. As shown particularly in FIGS. 28 and 29, drum 24 is rotatably mounted on a hollow axle 183 fixed by fasteners 181 within a housing 185 fixed to the vehicle chassis 2. Lever 22 is pivotably mounted to drum 24 by a pin 187 such that lever 22 is pivotable towards and away from drum 24 as well as rotatable about the drum axis. The upper portion of housing 185 is formed with a plurality of teeth 186 (also shown in FIG. 26) cooperable with a single tooth 188 fixed to lever 22. A rod 190 (FIG. 28) passes through aligned openings in drum 24 and lever 22. Rod 190 is formed with an enlarged head 191 at one end and carries a cross-pin 192 at the opposite end so as to couple drum 24 to lever 22 during the rotation or the lever. A spring 193 enclosing rod 190 and interposed between its enlarged head 191 and drum 24 urges lever 22 towards the drum, causing tooth 188 of lever 22 to seat within one of the fixed teeth 186 carried at the upper end of the drum housing 185, thereby normally locking lever 22 against rotation.

Figure 28:
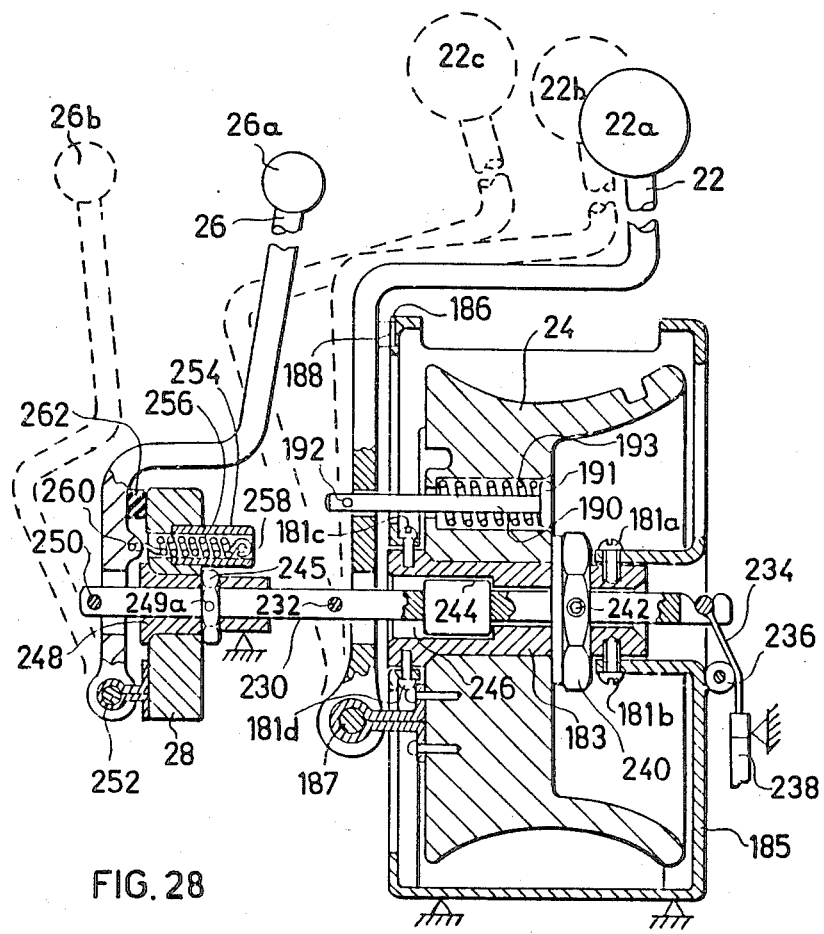
FIG. 28 is a transverse sectional view through the manual control arrangement illustrated in FIGS. 26 and 27.

Lever 22 is pivotable about pin 184 to assume any one of the three positions 22A, 22B, 22C illustrated in FIG. 28. Lever position 22A is the normal, inoperative position of the lever wherein its tooth 188 is received within one of the fixed teeth 186 of the drum housing 185 to lock the lever against rotation. In order to rotate the lever, it is first pivoted about pin 187 to position 22B wherein its tooth 188 unseats from the fixed teeth 186 permitting the lever to be rotated about the horizontal axis of the drum 24, the lever also rotating the drum by virtue of coupling pin 190. When lever 22, in its position 22B, is thus rotated with drum 24, the drum controls the continuously-variable transmission 60 (FIG. 3), and also controls friction clutch 58, reverse gear 77 and hand brake 78 as will be described below. When lever 22 is pivoted about pin 187 to position 22C in FIG. 28, it controls jaw clutch 76 (FIG. 3) as will also be described below.

The manner by which the rotation of drum 24 control the continuously-variable transmission 60 is best seen in FIG. 27. Thus, the outer circumference of drum 24 is formed with a recess 196 receiving one end of a lever 197 pivotably mounted at 197A. The opposite end of lever 197 is formed with a slot 198 receiving a pin 199 carried by rod 184A of the mechanism for varying the continuously-variable transmission 60. The opposite end of rod 184A carries a second pin 200 recievable in a slot 202 formed in the end of arm 180A which, as described above, moves arm 180A about its pivot 182A to move the two pairs of conical discs 170A, 170B and 172A, 172B (FIG. 3) towards or away from each other in order to change their effective diameters and thereby to vary transmission 60.

Figure 30:
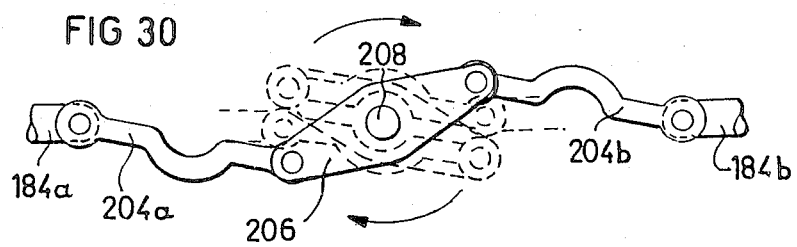
FIGS. 30 and 31 are front and top views, respectively, of mechanism connecting the manual control of FIGS. 26 and 27 to the continuously variable transmission unit.
Figure 31:
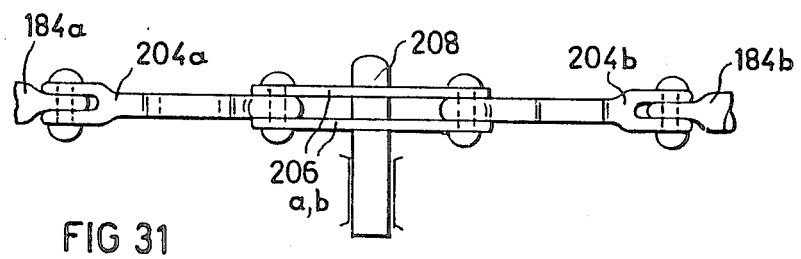

As described above with respect to FIG. 2, arm 180A is coupled to arm 180B for also pivoting it in order to vary transmission 60. The mechanism coupling arm 184A to arm 184B is best seen in FIGS. 30 and 31, wherein it will be seen that arm 184A is coupled by a link 204A to one end of a pair of levers 206A, 206B pivotable at their center on a pin 208. The opposite ends of levers 206A, 206B are pivotably coupled via another link 204B to arm 184B of the mechanism for controlling the continuously variable transmission 60.

The arrangement is such that when rod 184A (FIG. 27) is moved by lever 197 received within recess 196 during the rotation of drum 24, an equal and opposite movement is produced in arm 180B via links 204A, levers 206A, 206B and link 204B, so as to move the two conical discs 170A, 170B toward each other and conical discs 172A, 172B away from each other during one direction of movement of levers 184A, 184B, and to move conical discs 170A, 170B away from each other and conical discs 172A, 172B toward each other in the opposite direction of movement of lever 184A, to thereby vary the transmission ratio of the conical discs in transmission 60.

As indicated above, lever 22, by rotating drum 24 (FIG. 29), also controls friction clutch 58, reverse gear 77 (FIG. 3) and the hand brake 78. For this purpose, the side wall of drum 24 is formed with a shaped cam slot receiving a cam follower 212 carried at the end of a rod 214 movable within a tubular guide 217 fixed to the drum frame 185 (e.g., see FIGS. 29, 33). The opposite end of rod 214 carries a link 216 which operates the hand brake 78 and the friction clutch 58 such that the clutch iss first disengaged, and then the hand brake is actuated via link 215, when rod 214 is moved inwardly by cam slot 210.

Figure 29:
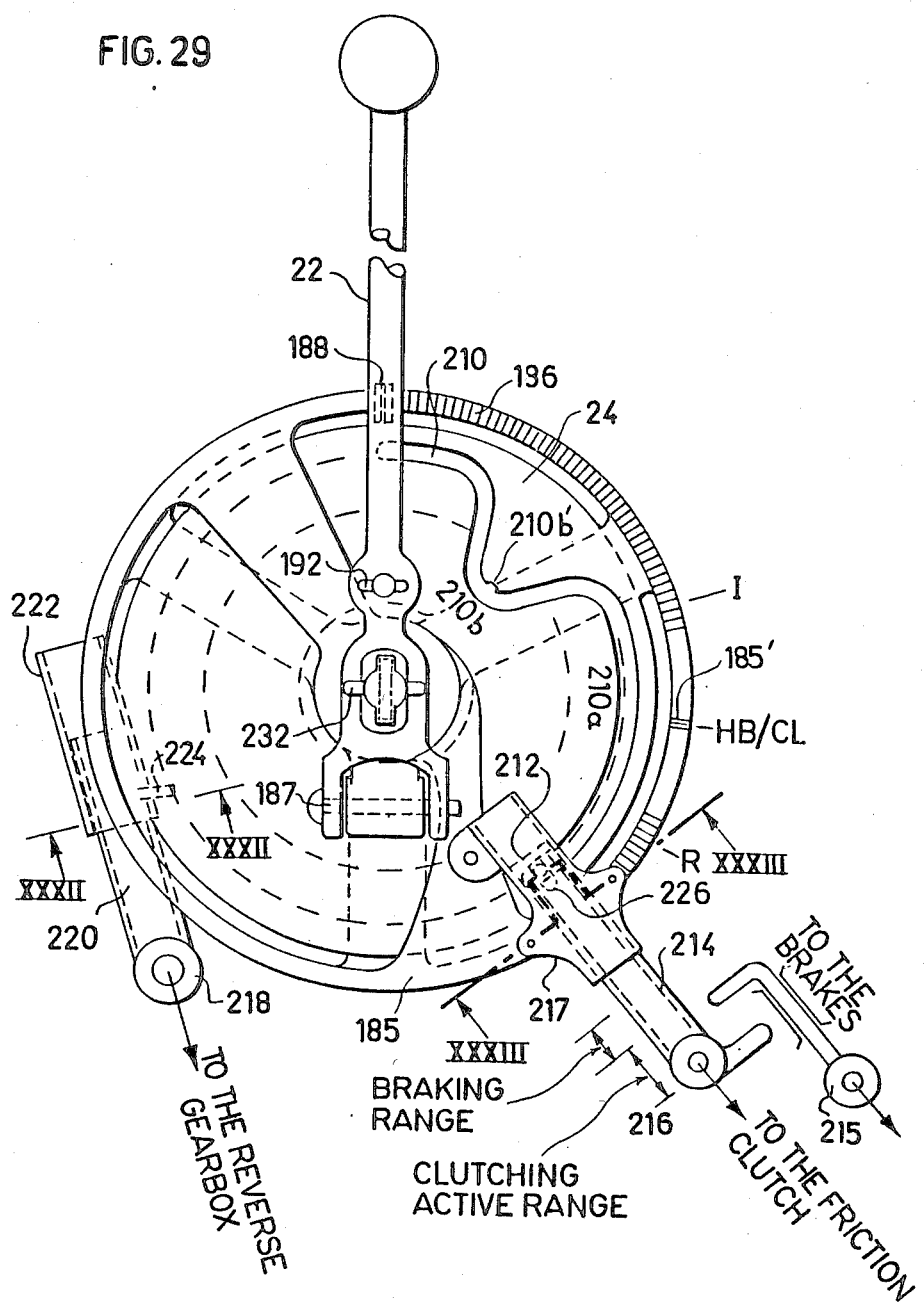
FIG. 29 is a side view illustrating a portion of the manual control arrangement of FIGS. 26 and 27.

The reverse gear 77 (FIG. 3), which may be of the reversible bevel-gear type, is operated by a link 218 carried at the end of another rod 220 movable within a tube 222 secured to drum housing 185 at the opposite side of the drum. Rod 222 carries an abutment member 224 projecting from rod 222 so as to be closely spaced to the outer circumference of drum 24, as shown particularly in FIG. 32. A lug 226 is secured to drum 24 by fasteners 228 at about the 5 o'clock position of the drum, as shown in FIG. 29, so that when the drum is rotated a predetermined distance, lug 226 engages abutment member 224 to move tube 220 (upwardly in FIG. 29), and thereby to actuate the reverse gear 77 for driving the vehicle in the reverse direction. When drum 24 is moved away from this "reverse" position, gear 77 may be automatically returned to its "forward" direction of travel, e.g. by return spring in the gear box for the reverse gear 77.

Lever 22 can also be used for disengaging the jaw clutch 76 (FIG. 3). This is done by pivoting the lever about its pivot pin 187, perpendicularly to the drum axle 183. As shown particularly in FIG. 28, a rod 230 is passed through an opening in lever 22 and through the drum axle 183. Rod 230 is provided with a cross-pin 232 engageable by the outer face of lever 22 when the lever is pivoted about pin 187, first to the position shown at 22B in FIG. 28, and then to the position shown at 22C. When the lever is pivoted to the latter position, it engages pin 232 to shift rod 230 (leftwardly in FIG. 28). The opposite end of rod 230 is attached to a cable 234 passed over a roller 236 and through a sleeve 238 to disengage jaw clutch 76 illustrated in FIGS. 1-3. A nut 240 is threaded to the end of hollow shaft 183 and is secured thereto by a screw 242. A key 244 is fixed to rod 230 and is movable within a slot 246 in hollow axle 180 to prevent rotary movement of the rod during its axial movement with respect to the drum.

It will thus be seen that pivoting lever 22 to its position shown at 22C in FIG. 28 will shift rod 230 leftwardly which, via cable 234 attached to the rod, will actuate jaw clutch 76 to disengage the clutch.

Jaw clutch 76 may also be disengaged by pivoting the second hand lever 26 from its normal position shown at 26A in FIG. 28 to its position shown at 26B. For this purpose, rod 230 is extended so as to pass through a hollow axle 248 rotatably mounting disc 28, and through an opening in lever 26, and is provided with a cross-pin 250 engageable with the outer face of the lever. Lever 26 is pivotably mounted at its lower end on another cross-pin 252 secured to disc 28. Thus, when lever 26 is pivoted about cross-pin 252 to the position illustrated at 26B in FIG. 28, it engages cross-pin 250 to shift rod 230 leftwardly, in the same manner that the similar movement of lever 22 shifted the rod, to effect the disengagement of jaw clutch 76.

A nut 245 is threaded onto the end of hollow axle 248 and is secured thereto by a screw 249A, for fixing the position of axle 248 with respect to disc 28, similar to the manner axle 183 is fixed with respect to drum 243.

Figure 34:
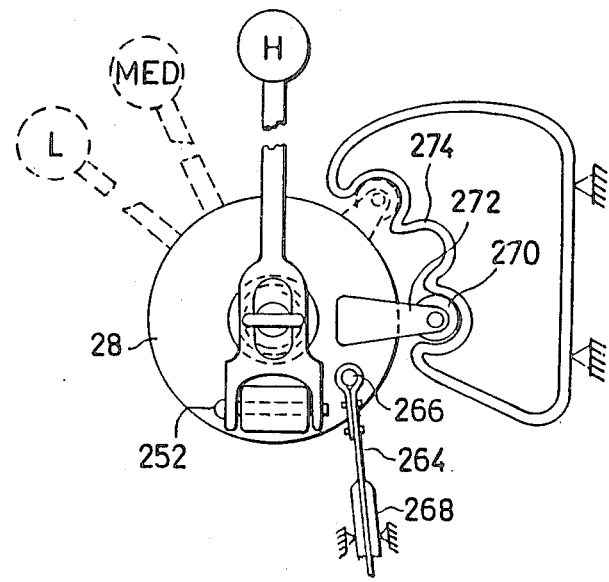
FIG. 34 is a side elevational view illustrating another part of the manual control mechanism of FIGS. 26 and 27.

While manual lever 26 can thus be used to disengage jaw clutch 76, its main function is to select the desired gear of the three-gear transmission 70 (FIG. 3). Thus, as shown in FIG. 34, lever 26 may be manually moved to any one of the three positions therein illustrated, position "H" being the "high-gear" position, position "MED" being the "medium-gear" position, and position "L" being the "low-gear" position.

Disc 28 is formed with a bore receiving a cylindrical tube 254 (FIG. 28) housing a spring 256. One end of spring 256 is fixed to a pin 258 in tube 254, and the opposite end is fixed to a pin 260 secured to lever 26. A rubber pad 262 is secured to the upper end of disc 28 and is normally firmly engaged by lever 26 under the influence of spring 256.

When lever 26 is rotated about the axis of shaft 248, it rotates the disc 28 with it. One end of a cable 264 (FIG. 34) is secured to a pin 266 carried by disc 28, the opposite end of the cable passing through a sleeve 268 to the three-gear transmission 70 (FIG. 3) such that any one of the three gears in this transmission may be selected by positioning lever 26 to the respective one of its three positions as illustrated in FIG. 34. Disc 28 is retained in any one of these positions by a roller 270 secured by plate 272 to disc 28, receivable in one of three retainer sockets 274 formed in a retainer plate secured to the vehicle chassis.

It will thus be seen that the manual levers 22 and 26, operated by the front occupant of the vehicle, may be used for controlling the vehicle in the following manner:

The vehicle may be shifted to the desired one of the three gears "HIGH", "MEDIM" or "LOW", by rotating lever 26 to the selected position as illustrated in FIG. 34. Rotation of lever 26 also rotates disc 28 which displaces cable 264 to the three-gear transmission 70 (FIG. 3) shifting the latter to the selected gear.

When the vehicle is in the selected gear, the continuously variable transmission 60 may be varied by moving lever 22. First lever 22 is pivoted to position 22B illustrated in FIG. 28 in order to release its tooth 188 from the teeth 186 fixed to the frame 185 of drum 24, thereby permitting lever 22, and drum 24, to be rotated about the drum axle 183. During this rotation of the drum, slot 196 (e.g. FIG. 27) cooperable with lever 197 pivots the two arms 180A, 180B to continuously vary transmission 60 during a first portion of the rotation of drum 24; slot 210 (FIG. 29) formed in side wall of drum 24, and cooperable with cam follower 212 carried by rod 214, actuates the friction clutch 58 and the vehicle brake 78 during another portion of rotation of drum 24; and lug 226 (FIGS. 29 and 32), engageable with abutment member 224 carried by tube 220, actuates the reverse gear 77 (FIG. 3) during another portion of the drum rotation in order to reverse the travel direction of the vehicle.

FIG. 29 illustrates the normal position of lever 22 and drum 24. In this position of the lever and drum, the transmission ratio of the continuously variable transmission 60 is higher, friction clutch 58 is engaged, brake 78 is not actuated, and reverse gear 77 is not actuated. In addition, jaw clutch 76 is engaged, and therefore the vehicle is traveling in the forward direction under any one of the three gear ratios selected by control lever 26.

If the operator (front occupant) wishes to decrease the transmission ratio, in order to obtain more power, he may move lever 22 in the clockwise direction, thereby also rotating drum 24 in the same direction. This causes lever 197 (FIG. 27) riding in slot 196 on the outer circumference of the drum to pivot in the direction bringing the respective ends of the two arms 180A, 180B (FIGS. 27 and 2) towards each other, thereby moving conical discs 170A, 170B towards each other, and conical discs 172A, 172B away from each other. This increases the effective diameter defined by conical discs 170A, 170B and decreases the efffective diameter defined by conical discs 172A, 172B, thereby decreasing the transmission ratio, providing more power to the vehicle. This control of transmission 60 is effected during the rotation of drum 24 by lever 22 along the arc indicated at "D" in FIG. 29.

During the rotation of drum 24 along arc "D", cam follower 212 rides in portion 210A of slot 210. This slot portion has a constant radius of curvature with respect to the axis of rotation of drum 24, and therefore rod 214 carrying cam follower 212 is not displaced; the friction clutch 58 is engaged and vehicle brakes 78 are therefore not actuated.

Continued rotation of lever 22 in the clockwise direction brings slot portion 210B of drum 24 to cam follower 212. The leading side of slot portion 210B extends radially inwardly, thereby projecting rod 214 radially inwardly to actuate the friction clutch 58 and vehicle hand brake 78. Slot portion 210B includes a detent 210B' which may be used to retain drum 24 in this hand brake acutating condition, detent 210B' being oriented so as to be seated by cam follower 212 at the same time that lever 22 is seated within a detent 185' formed in the fixed housing 185. In this hand brake acutating condition, the friction clutch 58 is also disengaged by the refraction of rod 214, the disengagement of the clutch being effected before the hand brake is actuated. The trailing end of slot portion 210B progresses radially outwardly, so that continued movement of lever 22 in the clockwise direction moves rod 214 radially outwardly to deactuate the hand brake and then to engage the friction clutch 58.

If the operator wishes to actuate the reverse gear 77, he would continue to rotate lever 22 in a clockwise direction, whereby lug 226 (FIGS. 29, 32) carried by drum 24 engages abutment member 224 carried by rod 220, to thereby shift the rod axially of its sleeve 222 to actuate the reverse gear 77 (FIGS. 1-3).

Steering

Steering of the vehicle is effected by the front occupant via vertically-extending steering rod 30 (FIGS. 1, 2). The steering rod 30 is pivotably mounted about a horizontal axis 280 at one side of the front occupant's seat so as not to interfere with the entry or exit of the front occupant, and is bulged outwardly to accomodate the occupant's body so that the upper end of the steering rod is conveniently located for grasping by the left hand of the front occupant.

As shown more particularly in FIGS. 4A-4C, a curved plate 282 is secured to the lower end of the steering rod 30 below pivot pin 280 and is rocked about the horizontal pivot pin when the steering rod is pivoted. Curved plate 282 is formed with a diagonally-extending cam slot 283 cooperable with a cam follower 284 formed with grooved side faces 285 (FIG. 4C) receiving the edges of plate 282. Cam follower 284 is coupled via pin 286 to a shift bar 287 movable between a pair of guide plates 288, in the direction transversely of the vehicle. Shift bar 287 is in turn coupled at one end to a connecting link 289 via a pin, the opposite end of link 289 being coupled via pin 290 to one end of a lever arm 291 pivotable about pin 292. The opposite end of lever arm 291 is pivotably mounted by ball joints 293A, 293B to a pair of connecting rods 294 extending transversely of the vehicle (FIG. 2) and coupled at their opposite ends by ball joints 295 to a pair of lever arms 296 pivotably mounted to the front axle 297 carrying the two front wheels 4. The two front wheels are pivotably mounted by king pins 298 such that when steering rod 30 is moved towards or away from the steerer's body, the two wheels 4 are turned in one or the other direction.

The upper end of steering rod 30 is also provided with hand lever 31 for actuating the vehicle brakes.

Figure 35:
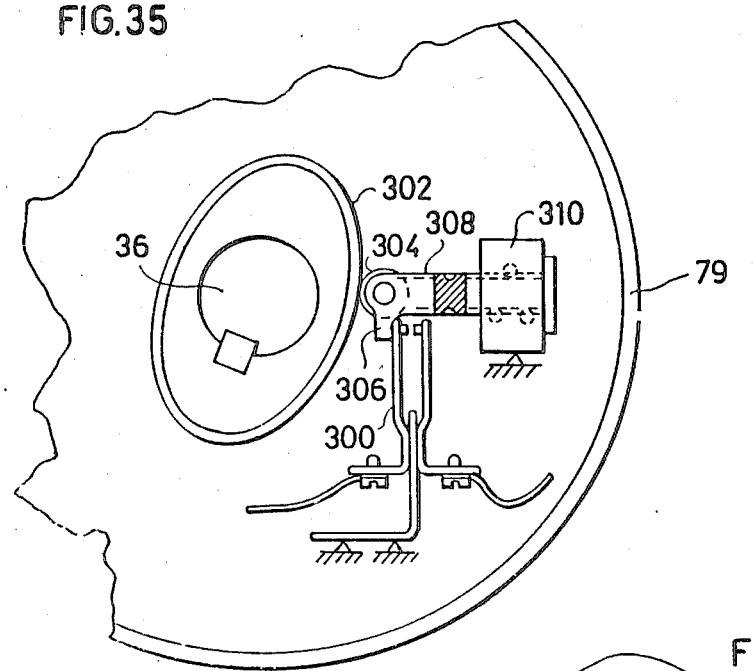
FIG. 35 is a fragmentary view illustrating the operation of a cam switch used for controlling indicator lights in the vehicle of FIGS. 1 and 2.
Figure 36:
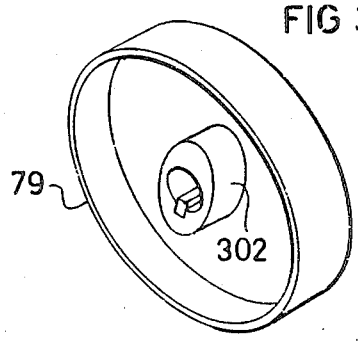
FIG. 36 is a three-dimensional view illustrating the flywheel.

Electrical Circuit (FIGS. 35 and 36)

Figure 37:
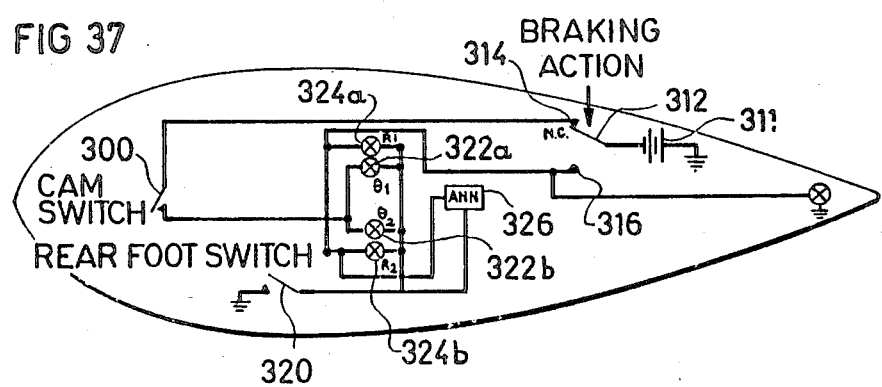
FIG. 37 is a schematical diagram illustrating electrical circuit in the vehicle of FIGS. 1 and 2.

FIGS. 35 and 37 illustrate the electrical circuit included in the vehicle in order to actuate various electrical accessories, and FIG. 36 illustrates the flywheel 79 which is used in this circuit.

Thus, the electrical circuit includes a cam switch 300 which is periodically actuated in synchronism with the rotation of the front crank shaft 36 by means of a control cam 302 integrally formed with, or secured to, flyweel 79 fixed to the crank shaft. A cam follower 304, rolling along the outer surface of control cam 302, periodically moves actuator 306 to actuate the cam switch 300. Actuator 306 is carried by a follower member 308 movable within a guide sleeve 310.

Power is supplied to the electrical circuit via a battery 311 carried by the vehicle and charged by generator 72 (FIG. 3). As shown in FIG. 37, the vehicle further includes a braking switch 312 normally engaging contact 314 but movable away from that contact to engage contact 316 upon actuation of the vehicle brakes, e.g. the hand brake 78 controlled by lever 22 or additional brake controlled by lever 31 (FIGS. 1, 2).

The electrical circuit further includes a rear footswitch 320 which is normally open but which is closed when the vehicle is being propelled by the assistance of a rear occupant, in which case the rear occupant closes foot switch 320 when he applies his feet to the rear foot pedals 16A, 16B. The electrical circuit further includes a pair of green indicator lamps 322A, 322B, and a pair of red indicator lamps 324A, 324B. These indicator lamps are preferably located so as to be easily viewable by the occupant of the rear seat 10. A sounder 326 may also be provided located to be clearly heard by the rear occupant.

The electrical circuit illustrated in FIG. 37 operates as follows:

When the rear seat of the vehicle 10 is occupied by a person who is to aid in propelling the vehicle, the rear foot switch 320 is closed, thereby enabling the green indicator lights 322A, 322B and red indicator lights 324A, 324B, viewable by the rear occupant, and also the sounder 326 heardable by the rear occupant. If, however, the rear seat is not occupied, these electrical elements are disabled.

During the normal operation of the vehicle, brake switch 312 engages contact 314, thereby connecting the indicator lights to the battery 311 via cam switch 300. Cam switch 300, being actuatable by control cam 302 fixed to the front crank shaft 36, thus controls the energization and deenergization of the green indicators 322A, 322B. These are viewable by the rear occupant and enable him to synchronize his operation of the rear foot pedals 16A, 16B and rear hand levers 20A, 20B with the operation of the front foot pedals by the front occupant in order to obtain the most efficient propulsion of the vehicle.

Whenever the vehicle is braked, however, brake switch 312 disengages from contact 314 and engages contact 316, whereby the two red indicator lamps 324A, 324B are now energized, as well as the sounder 326, clearly signaling to the rear occupant to immediately stop operating the rear foot pedals and rear hand levers.

The illustrated vehicle may be propelled by ther rear occupant alone, for example, to enable the front occupant to concentrate on steering only. In such case, the front occupant retains the front foot pedals in position so that cam 302 of flywheel 79 engages cam switch 300 to energize the green lights 322A, 322B in a continuous manner; this signals the rear occupant to operate the rear foot pedals and hand levers to propel the vehicle independently. If the front occupant wishes to signal the rear occupant to stop propelling, the front occupant may easily do this by merely moving the front foot pedals to move flywheel 79 to open cam switch 300, whereupon none of the indicator lights will be energized.

It is contemplated that the vehicle could include a number of other electrical devices and accessories, such as headlights, windshield wipers, turn indicators, radio, and the like commonly included in motor (as distinguished from human powered) vehicles.

Summary of Vehicle Operations and Advantages

One of the main advantages of the vehicle described above is that it permits propulsion by either a single occupant (the front occupant), by two occupants in tandem, or by the rear occupant alone, while the front occupant steers. During a tandem operation, both occupants face the front of the vehicle so as to enable viewing the direction of travel of the vehicle, which is much more preferable than a back-to-back arrangement as in the vehicles heretofore proposed. Moreover, the rear occupant, facing the back of the front occupant, can coordinate his movements with the movements of the front occupant, this coordination being permitted by the provision of the electrical signal lights, cam switch, brake switch, etc. (FIG. 37).

Further, the supine positions of the two occupants enable each to apply maximum power to the foot pedals (12A, 12B, 16A, 16B); and the addition of the hand levers (20A, 20B) for operation by the rear occupant substantially adds to the power available to propel the vehicle. The arrangement of the foot pedals, hand levers and controls enable the front and rear occupants to enter and leave the vehicle with ease. The vehicle seats 8, 10 are of boomrang shape and are fixed at an angle of 50°–70°, preferably at an angle of about 60° to the vehicle axis. This arrangement permits the occupants to lie in a supine position and to operate the foot pedals to propel the vehicle, with a substantial support to the occupants' backs against the rearwardly-directed reaction forces, and a minimum interference to using long, powerful foot strokes.

The conversion mechanism illustrated in FIGS. 5–13 for converting the reciprocatory movements of the foot pedals and hand levers to a rotary movement of the crank shafts (36 and 42) permits the use of longer levers enabling the occupants to apply longer and more powerful strokes for propelling the vehicle, as compared to the conventional arrangement using rotary foot pedals. This conversion mechanism, particularly the slide block 84 which slides within housing 82 against the action of spring 86 when the crank shaft is in its dead-center position, effectively extracts the crank shaft from such a dead-center position even should the vehicle be stopped and restarted while it is in this position. Moreover, as shown by the diagram in FIG. 13, a large force is immediately available under extracting the crank shaft from its dead-center position to aid in propelling the vehicle.

The provision of the direction-control device 50 of FIG. 3, more particularly illustrated in FIGS. 14–23, on both the front and rear crank shafts, permit each of the two occupants to reverse the direction of reciprocation of the foot pedals and/hand levers in order to locate them at a better position, such as at the beginning of the forward strokes, to enable the occupant to apply more power at the beginning of the stroke for propelling the vehicle.

In addition, the provision of both the continuously variable transmission 60 (as illustrated in FIGS. 3, 24 and 25), in combination with a conventional steppedgear transmission (70, FIG. 3) enables the transmission to be optimally controlled for all driving conditions of the vehicle. For example, under normal town driving conditions along relatively flat roads, the gear transmission 70 may be left in the "MID" position and the starting and acceleration continuously controlled by the continuously variable transmission 60, the "LOW" gear being used only for climbing or other high load conditions, and the "HIGH" gear being used as an "overdrive" when driving in the country. It will be appreciated that transmission 60 could also be continuously varied when driving under "LOW" or "HIGH" gear.

Particularly important advantages are provided by the various manual controls as illustrated in FIGS. 26–34.

Thus, control lever 26 cooperable with disc 28 may be used for selecting any one of three gear ratios provided in the vehicle; this lever may also be used for disengaging the jaw clutch (76, FIGS. 1-3) by pivoting the lever about pivot pin 252, for example, in order to shift gears while the vehicle is stationary.

Control lever 22 may be used in combination with drum 24 to provide a number of vehicle controls. Thus, lever 22, in combination with slot 196 formed in drum 24, may be used for varying the continuously variable transmission 60 within any one of the three gear ratios selected by lever 26 so as to provide an optimum transmission ratio for any road condition that the vehicle is likely to encounter, as described above. Further, lever 22, in cooperation with slot 210 formed in the side wall of drum 24, may be used for actuating the friction clutch 58 and the hand brake 76, this being done by rotating the drum to bring section 210b of slot 210 into engagement with cam follower 212. Further, hand lever 22 may also be used for reversing the direction of travel of the vehicle, this being done by rotating drum 24 to bring lug 226 (FIGS. 29, 32) into engagement with abutment member 224 of the mechanism for controlling reverse gear 77 (FIGS. 1-3). Lever 22 may also be used for disengaging friction clutch 58, in order to enable the vehicle propelling effort, when the vehicle is stationary, to be divided into two stages, namely: first to actuate the transmission to and including the generator; and then to gradually propel the vehicle on the road. Lever 22 may further be used to operate the electrical accessories, such as headlamps, windhshield wipers, radio, signal indicators, and the like, while the vehicle is stationary.

Lever 22, by pivoting it about pivot pin 187, may also be used to disengage jaw clutch 76, for example, to permit the continuously variable transmission 60 to be varied while the vehicle is stationary since the rotation of the conical discs 170a, 170b and 172a, 172b of the continuously variable transmission is necessary in order to vary it by moving the discs towards and away from each other as described above.

While the invention has been described with respect to one preferred embodiment, it will be appreciated that many variations, modifications and other applications of the invention may be made.

What is claimed is:

1. A human powered vehicle including a chassis, foot pedals operated by the occupant, a drive shaft, a driven wheel driven by the drive shaft, and a motion converter mechanism coupling said foot pedals to said drive shaft, comprising:
    a foot pedal lever pivotably mounting one end of said foot pedals to the vehicle chassis;
    a slide block slidably mounted on said foot pedal lever adjacent to but spaced from said one end thereof;
    a crank arm pivotably mounted at one end to said slide block and pivotably and eccentrically mounted at the opposite end to said drive shaft to and through a dead-center line passing through the pivot points of the crank arm and the axis of the drive shaft;
    a spring disposed in the space between said slide block and said one end of the foot pedal lever and urging said slide block to a home position away from said one end of the foot pedal lever;
    and constraining means for constraining said slide block to slide towards said one end of the foot pedal lever along a line which forms an angle of less than 90° with the dead-center line of said crank arm with respect to said drive shaft when the slide block is in its home position, such that a force applied to said foot pedal lever when the crank arm is in its dead-center position produces a component of force effective to move said slide block away from its home position and towards said one end of the foot pedal lever against the action of said spring, thereby moving said crank arm away from its dead-center position with respect to said drive shaft.

2. The vehicle according to claim 1, wherein said constraining means comprises a housing secured to said end of the foot pedal lever and formed with a guide-way having an axis extending at an angle of less than 90° with respect to said dead-center line of the crank arm when the slide block is in its home position, said slide block being slidable within said housing along said guide-way.

3. The vehicle according to claim 2, wherein said slide block carries a rod passing through an opening in an end wall in said housing, the projecting end of said rod being provided with a resilient disc for cushioning the return movement of said rod and slide block back to said home position under the action of said spring.

4. The vehicle according to claim 3, wherein said spring is a coil spring disposed within said housing between said slide block and housing end wall.

5. The vehicle according to claim 1, wherein said drive shaft includes:
    a direction-control device including means for (a) permitting free rotation of the drive shaft in one direction; (b) permits limited rotation of the drive shaft in the opposite direction, limited to a portion of a revolution of the drive shaft; and (c) blocking further rotation of the drive shaft in said opposite direction;
    and a one-way coupling between said drive shaft and said driven wheel for permitting rotation of the driven wheel in said one direction.

6. The vehicle according to claim 5, wherein said direction-control device comprises:
    a rotatable member coupled to said drive shaft so as to be rotated therewith; said rotatable member having an outer surface of cylindrical configuration formed with at least one recess therein;
    a curved cover pivotably mounted to the outer surface of said rotatable member and pivotable to a closed position covering said recess when said drive shaft rotates in said one direction, or to an open position exposing said recess when said drive shaft rotates in said opposite direction;
    and a stop member carried by said chassis and biassed to engage the cylindrical outer surface of said rotatable member and the outer surface of said curved cover when in its closed position during the rotation of said rotatable member in said one direction, but to seat within said recess when the cover member is in its open position during the rotation of said rotatable member in said opposite direction, and thereby to block the rotation of said drive shaft in said opposite direction after seating within said recess.

7. The vehicle according to claim 6, wherein said rotatable member is formed with two recesses at equally-spaced locations along its circumference, and with one of said pivotable covers over each of said recesses.

8. The vehicle according to claim 1, wherein said vehicle further comprises:
a pair of front wheels and at least one rear wheel;
a front seat for supporting a front occupant in a supine position at the front end of the chassis facing the front wheels;
a rear seat for supporting a rear occupant in a supine position behind the front seat and also facing the front wheels;
and a drive, including said motion converter mechanism, for propelling said vehicle, said drive further including foot pedals operated by said front occupant, foot pedals operated by said rear occupant, hand levers operated by said rear occupant, and a transmission from said foot pedals and hand levers to said rear wheel.

9. The vehicle according to claim 1, further including:
a pair of turnable front wheels for steering the vehicle;
a vertically-extending steering rod pivotable about a horizontal axis extending transversely of the vehicle;
and a coupling between said steering rod and said front wheels for turning them to steer the vehicle under the control of said steering rod.

10. A motion converter mechanism for converting the reciprocating motion of a reciprocating member to a rotary motion of a rotary member, comprising:
a lever pivotably mounted one end of said reciprocating member;
a slide block slidably mounted on said lever adjacent to but spaced from said one end thereof;
a crank arm pivotably mounted at one end to said slide block and pivotably and accentrically mounted at the opposite end to said rotary member to and through a dead-center line passing through the pivot points of the crank arm and the axis of the rotary member;
a spring disposed in the space between said slide block and said one end of the lever and urging said slide block to a home position away from said one end of the lever;
and constraining means for constraining said slide block to slide towards said one end of the lever along a line which forms an angle of less than 90° with the dead-center line of said crank arm with respect to said rotary member when the slide block is in its home position, such that a force applied to said lever when the crank arm is in its dead-center position produces a component of force effective to move said slide block away from its home position and towards said end of the lever against the action of said spring, thereby moving said crank arm away from its dead-center position with respect to said rotary member.

11. The motion converter mechanism according to claim 10, wherein said constraining means comprises a housing secured to said end of the lever and formed with a guide-way having an axis extending at an angle of less than 90° with respect to said dead-center line of the crank arm when the slide block is in its home position, said slide block being slidable within said housing along said guide-way.

12. The motion converter mechanism according to claim 11, wherein said slide block carries a rod passing through an opening in an end wall in said housing, the projecting end of said rod being provided with a resilient disc for cushioning the return movement of said rod and slide block back to said home position under the action of said spring.

13. The motion converter mechanism according to claim 12, wherein said spring is a coil spring disposed within said housing between said slide block and housing end wall.

* * * * *

UNITED STATES PATENT AND TRADEMARK OFFICE
CERTIFICATE OF CORRECTION

PATENT NO. : 4,708,356                    Page 1 of 2
DATED     : November 24, 1987
INVENTOR(S) : Shmuel Levavi It is certified that error appears in the above-identified patent and that said Letters Patent is hereby corrected as shown below:

In the drawings, add the following missing sheet containing
   Figs. 1 and 2.
Column 10, line 17, change "howver" to --However--.
Column 12, line 35, change "or" to --of--.
Column 12, line 67, change "recievable" to --receivable--.
Column 13, line 38, change "iss" to --is--.
Column 14, line 64, change "MEDIM" to --MEDIUM--.
Column 16, line 47, change "36" to --37--.
Column 17, line 42, change "ther" to --the--.
Column 18, line 40, change "under" to --upon--.

Signed and Sealed this

Tenth Day of January, 1989

Attest:

DONALD J. QUIGG

Attesting Officer    Commissioner of Patents and Trademarks

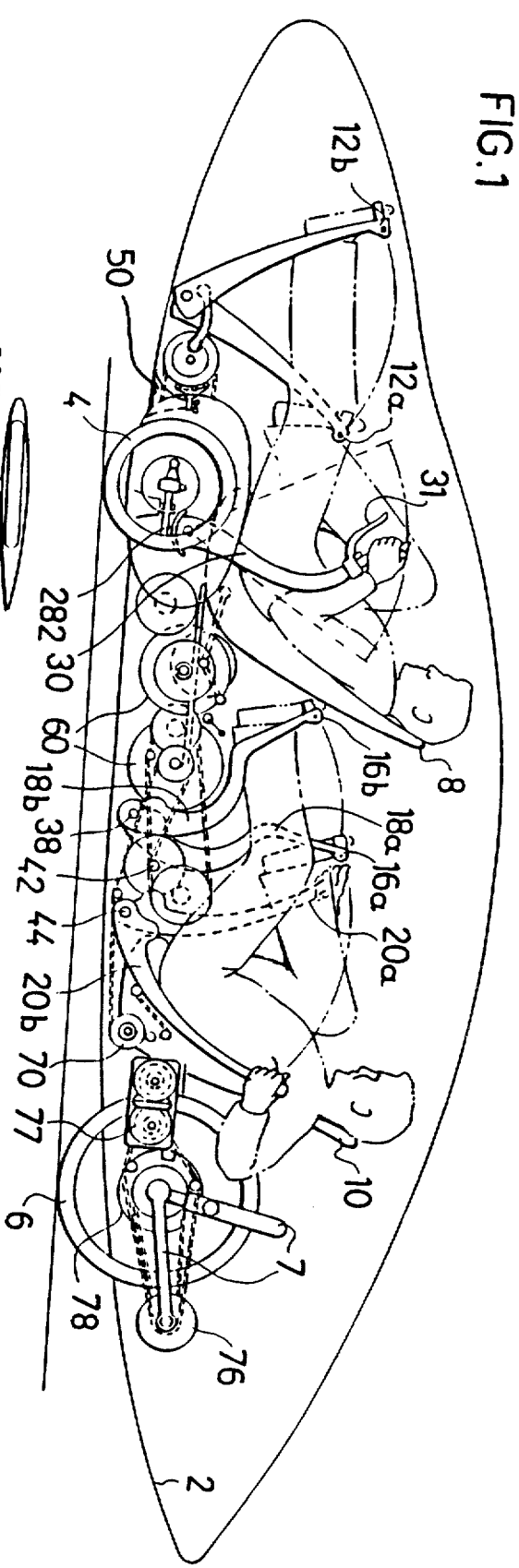
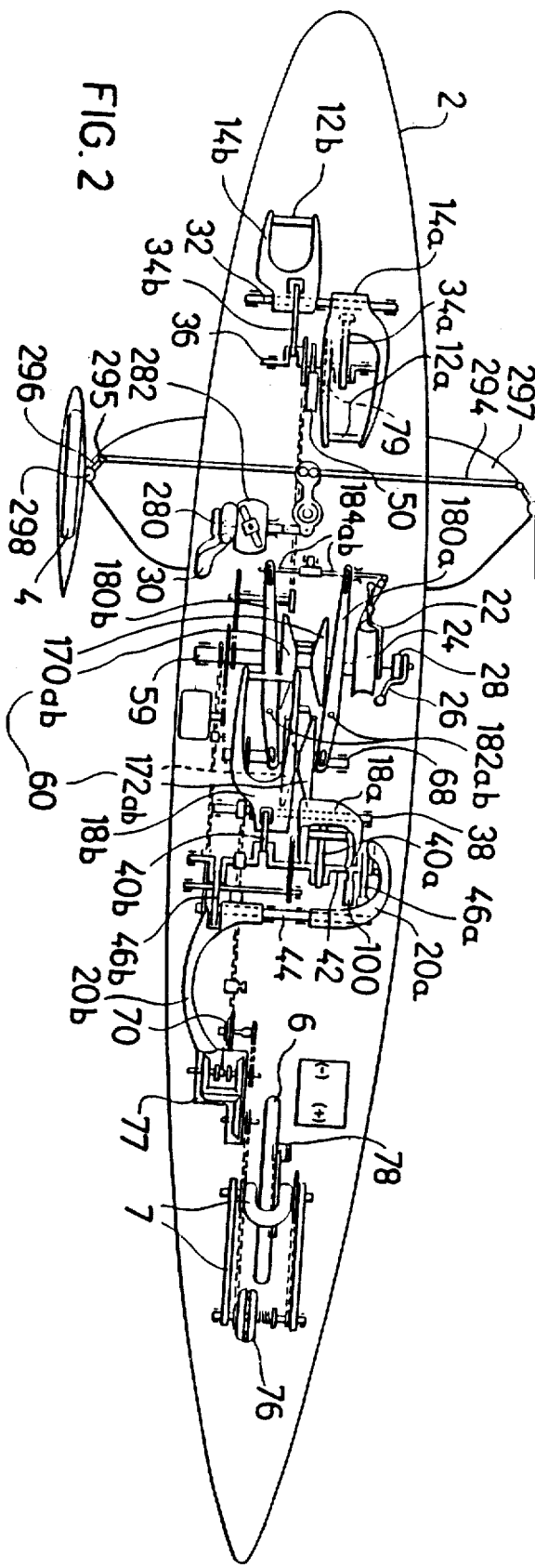
FIG. 1
FIG. 2